US008235177B2

(12) United States Patent
Kawahara et al.

(10) Patent No.: US 8,235,177 B2
(45) Date of Patent: Aug. 7, 2012

(54) LUBRICANT SUPPLY DEVICE, IMAGE FORMING APPARATUS, AND PRESSING DEVICE

(75) Inventors: Shinichi Kawahara, Tokyo (JP); Hiroomi Harada, Kawasaki (JP); Teruyuki Kasuga, Atsugi (JP); Takatsugu Fujishiro, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 1515 days.

(21) Appl. No.: 11/508,238

(22) Filed: Aug. 23, 2006

(65) Prior Publication Data

US 2007/0068738 A1 Mar. 29, 2007

(30) Foreign Application Priority Data

| | | |
|---|---|---|
| Sep. 22, 2005 | (JP) | 2005-276023 |
| Nov. 22, 2005 | (JP) | 2005-336791 |
| Jan. 30, 2006 | (JP) | 2006-021221 |
| Mar. 30, 2006 | (JP) | 2006-093053 |
| Jul. 24, 2006 | (JP) | 2006-200270 |

(51) Int. Cl.
*F16N 15/00* (2006.01)

(52) U.S. Cl. ............ 184/99; 184/3.2; 399/302; 399/346

(58) Field of Classification Search .................... 184/99, 184/3.2; 399/302, 346
See application file for complete search history.

(56) References Cited

U.S. PATENT DOCUMENTS

| | | | | |
|---|---|---|---|---|
| 282,837 | A * | 8/1883 | Brinkerhoff | 184/99 |
| 408,833 | A * | 8/1889 | Faul | 184/99 |
| 445,013 | A * | 1/1891 | Faul | 184/99 |
| 940,572 | A * | 11/1909 | Agner | 222/391 |
| 1,694,153 | A * | 12/1928 | Watres | 184/45.1 |
| 2,589,582 | A * | 3/1952 | Strughold et al. | 508/130 |
| 3,027,974 | A * | 4/1962 | Allen | 184/99 |
| 5,054,582 | A * | 10/1991 | Aracil | 184/3.2 |
| 5,251,724 | A * | 10/1993 | Szatkowski et al. | 184/3.2 |
| 6,775,511 | B2 * | 8/2004 | Kosuge | 399/346 |
| 7,035,582 | B2 | 4/2006 | Suda et al. | |
| 7,162,179 | B2 * | 1/2007 | Yoshida | 399/101 |
| 2002/0037187 | A1 | 3/2002 | Kai et al. | |
| 2005/0084304 | A1 | 4/2005 | Kataoka et al. | |
| 2005/0152722 | A1 | 7/2005 | Tawada et al. | |

(Continued)

FOREIGN PATENT DOCUMENTS

DE 39 41 196 C 1 4/1991

(Continued)

OTHER PUBLICATIONS

U.S. Appl. NO. 12/014,557, filed Jan. 15, 2008, Harada.

(Continued)

*Primary Examiner* — Robert A Siconolfi
*Assistant Examiner* — James Hsiao
(74) *Attorney, Agent, or Firm* — Oblon, Spivak, McClelland, Maier & Neustadt, L.L.P.

(57) ABSTRACT

A lubricant supply device includes a solid lubricant, a supply member contacting and rubbing the solid lubricant and thereby scraping a lubricant off the solid lubricant and supplying the lubricant to a lubricant supplying target, and a pressing mechanism pressing the solid lubricant against the supply member. The pressing mechanism includes a biasing device, and a plurality of pressing members receiving a biasing force of the biasing device and thereby pressing places of the solid lubricant at symmetrical positions with respect to a center of a contact part of the solid lubricant contacting the supply member, respectively.

14 Claims, 14 Drawing Sheets

U.S. PATENT DOCUMENTS

| | | | |
|---|---|---|---|
| 2006/0194662 | A1 | 8/2006 | Hozumi et al. |

FOREIGN PATENT DOCUMENTS

| | | | |
|---|---|---|---|
| EP | 1 014 218 | B1 | 6/2000 |
| EP | 1 510 879 | A1 | 3/2005 |
| EP | 1 586 958 | A2 | 10/2005 |
| JP | 7-175360 | | 7/1995 |
| JP | 2001-305907 | | 11/2001 |
| JP | 2006-3537 | | 1/2006 |

OTHER PUBLICATIONS

U.S. Appl. No. 11/853,529, filed Sep. 11, 2007, Kawahara, et al.

* cited by examiner

LUBRICANT SUPPLY DEVICE, IMAGE FORMING APPARATUS, AND PRESSING DEVICE

BACKGROUND OF THE INVENTION

1. Field of the Invention

The present invention relates to a lubricant supply device supplying a lubricant scraped off a solid lubricant by contacting and rubbing the solid lubricant to a lubricant supplying target, an image forming apparatus such as a copier, a printer, a facsimile apparatus, etc., using the lubricant supply device, and a pressing device applicable to the lubricant supply device.

2. Discussion of the Background

As the lubricant supply device of this kind, for example, the one disclosed in Japanese Patent Laid-open Publication No. 2001-305907 is known. The lubricant supply device of the JP Publication includes a brush roller (a supply member) contacting a solid lubricant in a bar shape and supplying a lubricant in a powdered state, scraped off the solid lubricant by rubbing the solid lubricant, to a photoconductor belt or an intermediate transfer belt (a lubricant supplying target). The solid lubricant is held with a solid lubricant holding member, and a spring (a biasing device) is in contact with the solid lubricant holding member. The solid lubricant is pressed against the brush roller by the biasing force of the spring. When the brush roller is rotated, the solid lubricant contacting the brush roller is rubbed by the brush roller and thereby, a lubricant scraped off the solid lubricant and adhered to the brush roller is coated on the surface of the photoconductor belt or the intermediate transfer belt. Further, a lubricant equalization blade is provided in the lubricant supply device. The lubricant equalization blade presses and spreads the lubricant on the surface of the photoconductor belt or the intermediate transfer belt so that a lubricant layer uniform in thickness is formed on the surface of the photoconductor belt or the intermediate transfer belt.

FIG. 1 is a partially enlarged diagram illustrating the principal part of a pressing mechanism generally adopted in a background lubricant supply device. FIG. 1 illustrates the pressing mechanism viewed from the direction orthogonal to both of the longitudinal direction of a solid lubricant 262 (the left-to-right direction in figure) and the direction in which the solid lubricant 262 is pressed against a supply member (the vertical direction in figure), and in figure, only the part of the pressing mechanism at one end side in the longitudinal direction of the solid lubricant 262 is illustrated. The structure of the pressing mechanism at the other end side of the solid lubricant 262 is substantially the same as that of the part of the pressing mechanism illustrated in figure.

Generally, in the background lubricant supply device, both side end parts in the longitudinal direction of the solid lubricant 262 are biased by individual springs 263 in the direction in which the solid lubricant 262 is pressed against the supply member and thereby the solid lubricant 262 is pressed against the supply member. Although detailed description is not made in the above-described JP Publication, the lubricant supply device of the above-described JP Publication is similarly constructed. In such a structure that both side end parts in the longitudinal direction of the solid lubricant 262 are biased with the individual springs 263, there has been a problem that the solid lubricant 262 cannot be evenly pressed against the supply member in the longitudinal direction of the solid lubricant due to unevenness in the biasing forces of the springs 263.

More specifically, in the initial stage wherein the heights of both side end parts in the longitudinal direction of the solid lubricant 262 are equal, by suppressing the production error in the springs 263 as much as possible, it might be possible to almost eliminate the difference between the biasing forces of the springs 263. Accordingly, when it is in the initial stage, it might be possible to press the solid lubricant 262 against the supply member almost evenly in the longitudinal direction of the solid lubricant 262. However, it is extremely difficult to completely eliminate the production error in the springs 263 and a difference might exist between the biasing forces of the springs 263. When even a slight difference exists between the biasing forces of the springs 263, as the solid lubricant 262 is scraped off with the supply member, the heights at both side end parts in the longitudinal direction of the solid lubricant 262 become different from each other. In consequence, over time, the elongation amounts of the springs 263 gradually differ from each other and the difference between the biasing forces of the springs 263 increases. Consequently, even if the difference between the biasing forces of the springs 263 has been very small and the solid lubricant 262 has been pressed against the supply member almost evenly in the initial stage, over time, the difference in the biasing forces of the springs 263 increases and thereby it becomes impossible to press the solid lubricant 262 evenly against the supply member.

If it becomes impossible to press the solid lubricant 262 evenly against the supply member as described above, unevenness is generated in the lubricant adhered on the surface of a lubricant supplying target, and a deviation is generated in the lubricating property given by the lubricant on the lubricant supplying target. Consequently, it becomes impossible to obtain a desired lubricating property. In the lubricant supply device described in the above-described JP Publication, as described above, the lubricant equalization blade is provided to reduce the unevenness in the lubricant adhered on the surface of the lubricant supplying target. However, the lubricant adhered on the surface of the lubricant supplying target unevenly in the longitudinal direction of the solid lubricant 262 cannot be pressed and spread sufficiently evenly only by pressing and spreading the lubricant adhered on the surface of the lubricant supplying target with the lubricant equalization blade, so that the unevenness in the lubricant cannot be sufficiently reduced.

The above-described problem is not limited to the structure supplying a lubricant scrapped off the solid lubricant 262 by the supply member such as a brush roller to the lubricant supplying target, and it similarly occurs in the structure causing the lubricant supplying target to directly contact the solid lubricant 262 and thereby scraping a lubricant off the solid lubricant 262 by the lubricant supplying target.

SUMMARY OF THE INVENTION

The present invention has been made in view of the above-discussed and other problems and addresses the above-discussed and other problems.

Preferred embodiments of the present invention provide a novel lubricant supply device capable of pressing a solid lubricant evenly against a supply member, an image forming apparatus using the lubricant supply device, and a pressing device applicable to the lubricant supply device.

The preferred embodiments of the present invention further provide a novel lubricant supply device capable of pressing a solid lubricant evenly against a lubricant supplying target, an image forming apparatus using the lubricant supply device, and a pressing device applicable to the lubricant supply device.

The preferred embodiments of the present invention further provide a novel pressing device capable of making smaller the amount of change over time in the pressing force when pressing a pressing target, such as a solid lubricant, etc., against a lubricant supplying target.

According to an embodiment of the present invention, a lubricant supply device includes a solid lubricant, a supply member contacting and rubbing the solid lubricant and thereby scraping a lubricant off the solid lubricant and supplying the lubricant to a lubricant supplying target, and a pressing mechanism pressing the solid lubricant against the supply member. The pressing mechanism includes a biasing device, and a plurality of pressing members receiving a biasing force of the biasing device and thereby pressing places of the solid lubricant at symmetrical positions with respect to a center of a contact part of the solid lubricant contacting the supply member, respectively.

According to another embodiment of the present invention, an image forming apparatus includes an image bearing member and a solid lubricant supplying device supplying a lubricant to the surface of the image bearing member. The image forming apparatus eventually transfers an image on the image bearing member onto a recording member to form the image on the recording member. The lubricant supply device includes a solid lubricant, a supply member contacting and rubbing the solid lubricant and thereby scraping a lubricant off the solid lubricant and supplying the lubricant to the image bearing member, and a pressing mechanism pressing the solid lubricant against the supply member. The pressing mechanism includes a biasing device, and a plurality of pressing members receiving a biasing force of the biasing device and thereby pressing places of the solid lubricant at symmetrical positions with respect to a center of a contact part of the solid lubricant contacting the supply member, respectively.

According to still another embodiment of the present invention, a pressing device pressing an object to be pressed in a predetermined direction is provided. The pressing device includes a biasing device, and a plurality of pressing members receiving a biasing force of the biasing device and thereby pressing places of the object to be pressed at symmetrical positions with respect to a center of a pressed part of the object to be pressed, respectively.

In the above-described embodiments of the present invention, the pressing forces of a plurality of pressing members are given with the biasing force of a single biasing device. The biasing force of the single biasing device acts equally to the pressing members, so that the pressing forces of the pressing members pressing a solid lubricant respectively become equal to each other. The pressing members press the places of the solid lubricant at symmetrical positions with respect to the center of a contact part of the solid lubricant contacting a supply member or a lubricant supplying target, so that the solid lubricant can be pressed evenly against the supply member or the lubricant supplying target. Consequently, not only in the initial stage but also after the solid lubricant has been gradually scraped with the supply member or the lubricant supplying target and decreased, the solid lubricant can be evenly pressed against the supply member or the lubricant supplying target.

According to still another embodiment of the present invention, a pressing device pressing an object to be pressed in a predetermined direction includes a biasing device and a pressing mechanism receiving a biasing force of the biasing device and thereby pressing the object to be pressed. The pressing mechanism includes a biasing force transmission device transmitting the biasing force of the biasing device to the object to be pressed such that an amount of change in a pressing force pressing the object to be pressed relative to an amount of change over time in the biasing force of the biasing device is smaller than in a structure pressing the object to be pressed such that the biasing force of the biasing device and the pressing force pressing the object to be pressed agree.

In the embodiment of the present invention described immediately above, as compared with a background pressing mechanism pressing an object to be pressed such that the biasing force of a biasing device and the pressing force pressing the object to be pressed agree, the amount of change in the pressing force pressing the object to be pressed relative to the amount of change over time in the biasing force of the biasing device is smaller, so that the amount of change over time in the pressing force when pressing the object to be pressed against a lubricant supplying target can be made smaller.

BRIEF DESCRIPTION OF THE DRAWINGS

A more complete appreciation of the present invention and many of the attended advantages thereof will be readily obtained as the present invention becomes better understood by reference to the following detailed description when considered in connection with the accompanying drawings, wherein.

DETAILED DESCRIPTION OF THE PREFERRED EMBODIMENTS

Figure 1:
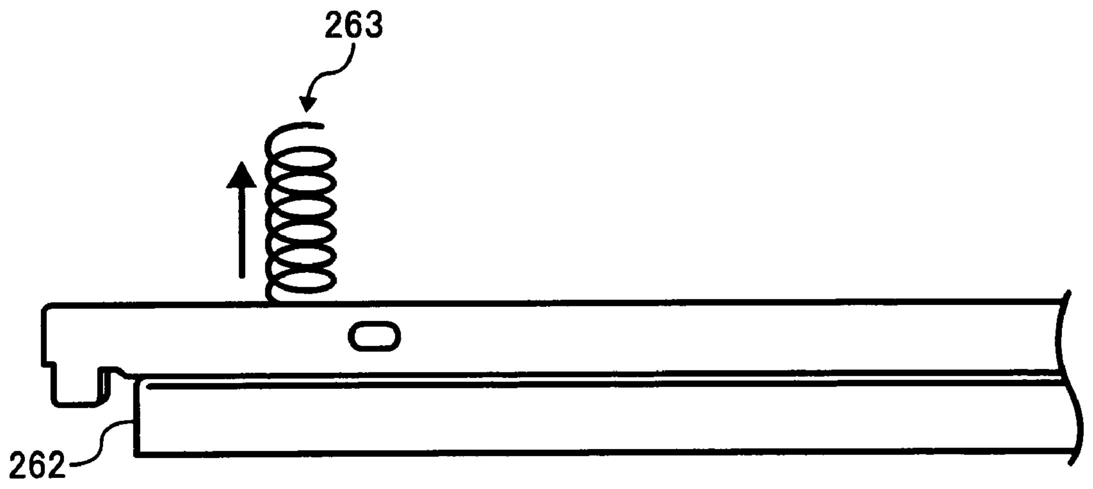
FIG. 1 is a partially enlarged diagram illustrating the principal part of a pressing mechanism generally adopted in a background lubricant supply device.

Referring now to the drawings, wherein like reference numerals designate identical or corresponding parts throughout the several views, preferred embodiments of the present invention are described.

Figure 2:
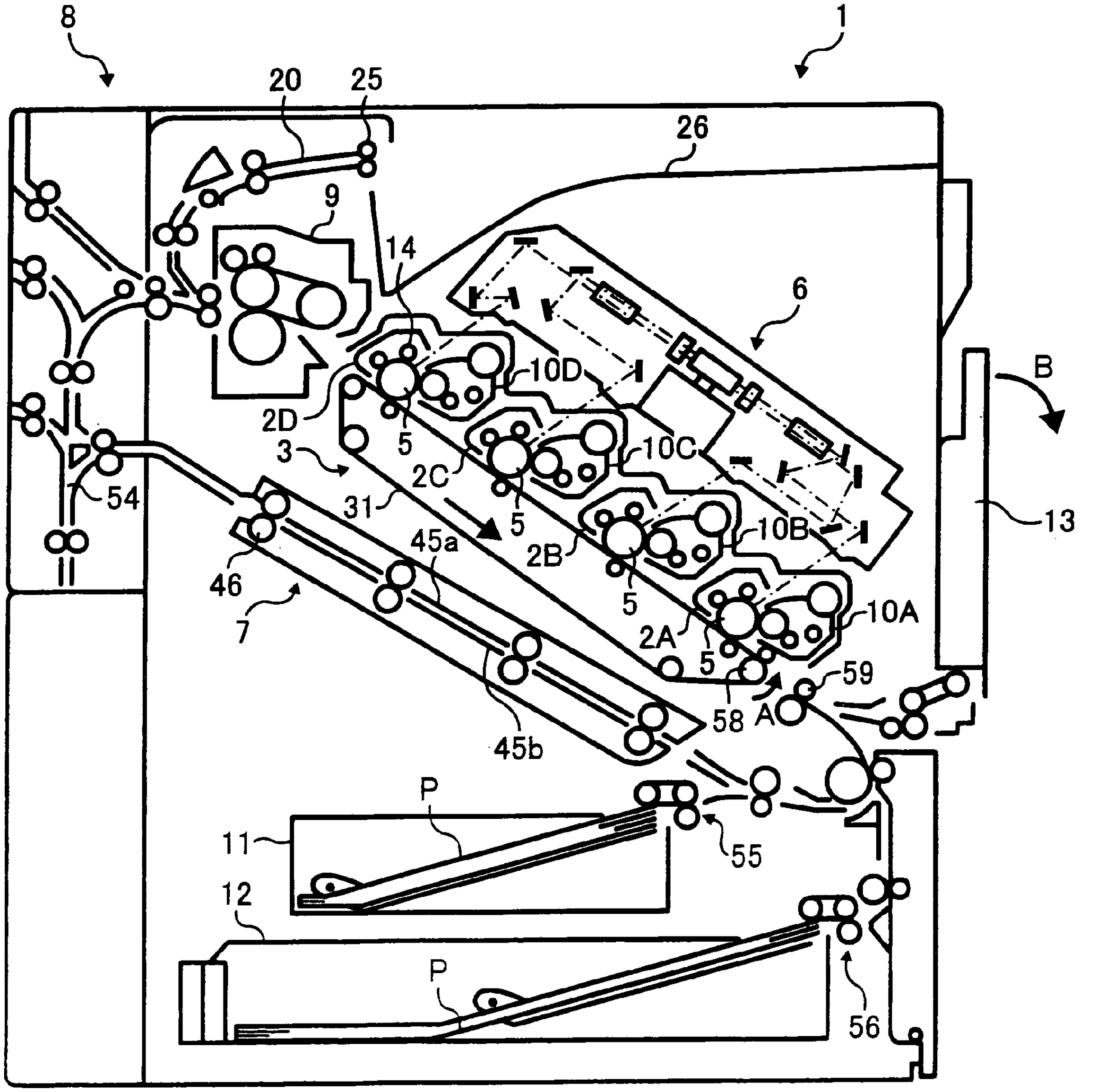
FIG. 2 is a schematic diagram illustrating an exemplary overall structure of a printer as an image forming apparatus according to an embodiment of the present invention.

FIG. 2 is a schematic diagram illustrating an exemplary overall structure of a printer 1 as an image forming apparatus according to an embodiment of the present invention.

Image formation units 2A, 2B, 2C and 2D provided with photoconductors serving as image bearing members are installed inside of the main body of the printer 1 detachably from the main body, respectively. A transfer device 3 provided with a transfer belt 31 spanned around a plurality of rollers is arranged substantially in the center part of the main body. The transfer belt 31 is driven to rotate in the direction indicated by an arrow "A" in figure. The image formation units 2A, 2B, 2C and 2D are located above the transfer belt 31, respectively, and are arranged such that respective photoconductors 5 contact the surface of the transfer belt 31. Further, development devices 10A, 10B, 10C and 10D, each using toner of a different color, are provided to correspond to the image formation units 2A, 2B, 2C and 2D. The image formation units 2A, 2B, 2C and 2D are substantially the same in structure, and the image formation unit 2A forms images corresponding to magenta, the image formation unit 2B forms images corresponding to cyan, the image formation unit 2C forms images corresponding to yellow, and the image formation unit 2D forms images corresponding to black.

A writing unit 6 is arranged above the image formation units 2A, 2B, 2C and 2D. The writing unit 6 includes four light sources for respective colors, using laser diodes (LDs), respectively. The writing unit 6 further includes a polygon scanner including a polygon mirror having six surfaces and a polygon motor. An optical system including an fθ lens and a long cylindrical lens is arranged in the optical path of each light source. The laser light emitted from each laser diode is deflected with the polygon scanner to scan and illuminate the surface of the corresponding photoconductor 5.

A duplex unit 7 is arranged below the transfer belt 31. Further, a reversing unit 8 is installed at the left side in figure of the main body of the printer 1. The reversing unit 8 reverses a transfer sheet (recording member) on which an image has been formed, and discharges the transfer sheet or conveys the transfer sheet to the duplex unit 7. The duplex unit 7 includes a pair of conveyance guiding plates 45*a* and 45*b* and plural pairs (four pairs, in this example) of conveyance rollers 46. In the duplex copying mode in which images are formed on both sides of a transfer sheet, after forming an image on one side of the transfer sheet, the transfer sheet is conveyed to a reversing conveyance path 54 of the reversing unit 8, and the transfer sheet is then reversed toward a sheet feeding part described later. The reversing unit 8 reverses a transfer sheet for forming images on both sides thereof and conveys the transfer sheet to the duplex unit 7 as described above, or discharges a transfer sheet on which an image has been formed on one side thereof without reversing the transfer sheet so as to be discharged with the side carrying the image faced upward or after reversing the transfer sheet so as to be discharged with the side carrying the image faced downward. Sheet feeding cassettes 11 and 12 are provided in the sheet feeding part, and further, sheet separating/feeding devices 55 and 56 separating transfer sheets one from the other and feeding the separated transfer sheet are provided for respective sheet feeding cassettes 11 and 12.

A fixing device 9, which fixes an image transferred onto a transfer sheet to the transfer sheet, is provided between the transfer belt 31 and the reversing unit 8. A reverse discharging path 20 is formed at the downstream side of the fixing device 9 in the sheet conveyance direction, separating from the conveyance path to the reversing unit 8. The transfer sheet conveyed to the reverse discharging path 20 is discharged onto a discharge tray 26 with a discharging roller pair 25. The sheet feeding cassettes 11 and 12 are provided in the bottom part of the main body of the printer 1, one above the other, and accommodate transfer sheets of different sizes. Further, a manual sheet feed tray 13 is provided to the right side surface of the main body in figure. The manual sheet feed tray 13 is configured to open in the direction of the arrow "B" in figure, and a transfer sheet can be manually fed in by opening the manual sheet feed tray 13.

Figure 3:
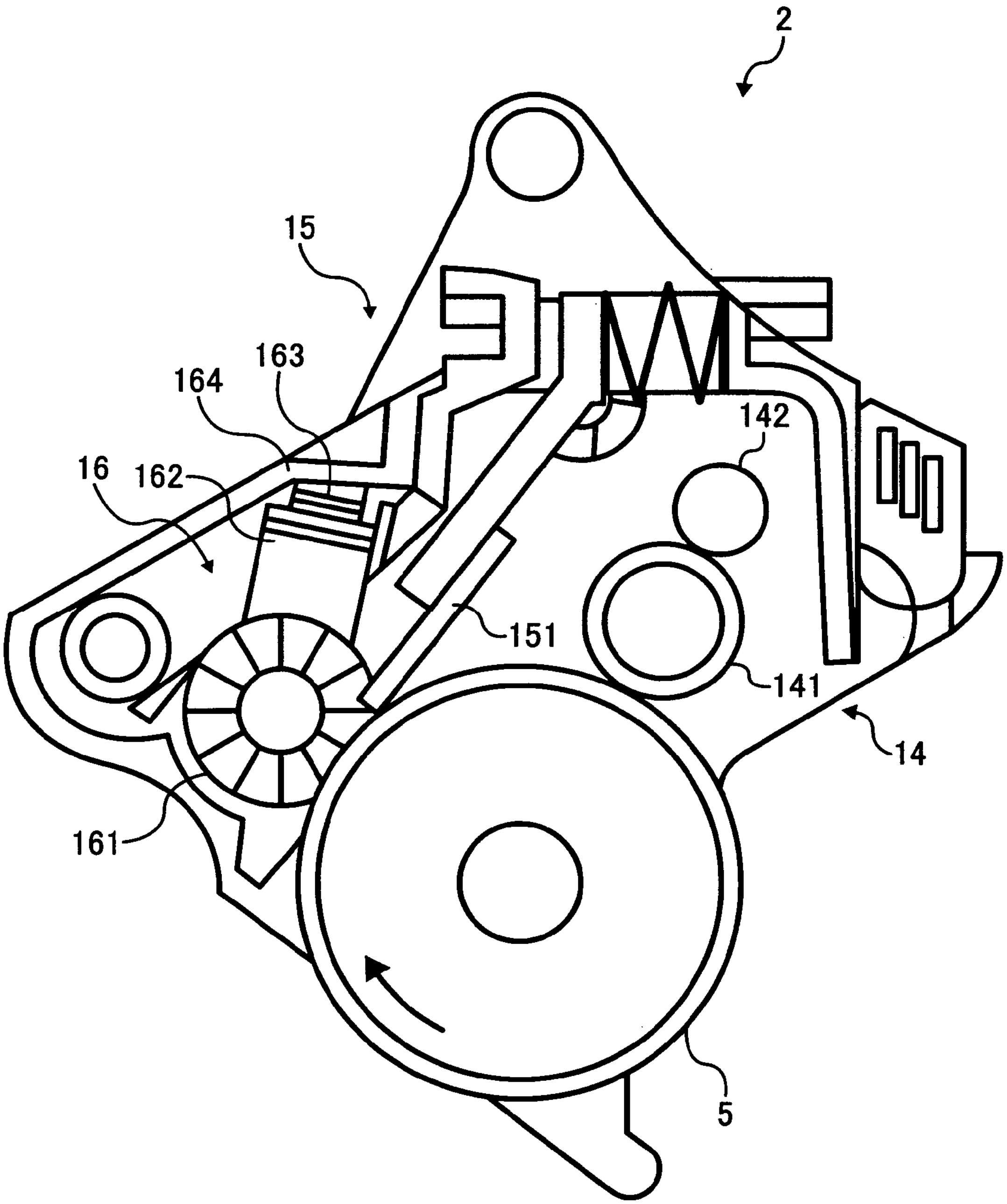
FIG. 3 is a schematic diagram illustrating an exemplary structure of one of the image formation units provided in the printer.

FIG. 3 is a schematic diagram illustrating an exemplary structure of one of the image formation units 2A, 2B, 2C and 2D.

Each of the image formation units 2A, 2B, 2C and 2D includes the photoconductor 5 on which a latent image is formed, a charging device 14 uniformly charging the surface of the photoconductor 5, and a cleaning device 15 cleaning the surface of the photoconductor 5.

As the material for the photoconductor 5, a material having optical conductivity is used, for example, an amorphous metal such as an amorphous silicon, an amorphous selenium, etc., and an organic compound such as a bisazo pigment, a phthalocyanine pigment, etc. Considering environmental protection and processing after the photoconductor 5 has been used, an OPC photoconductor using an organic compound is preferable.

For the charging device 14, any of the corona method, the roller method, the brush method, and the blade method may be used. In this example, the roller method is used in the charging device 14. The charging device 14 includes a charging roller 141, a charging roller cleaning brush 142, which is in contact with the charging roller 141 to clean the charging roller 141, and an electric source, not shown, which is connected with the charging roller 141. The charging device 14 uniformly charges the surface of the photoconductor 5 by applying high voltage to the charging roller 141.

The cleaning device 15 includes a cleaning blade 151 contacting the photoconductor 5, and a lubricant coating device 16 serving as a lubricant supply device scraping a solid lubricant 162 and supplying a lubricant, scrapped off the solid lubricant 162 in a fine powder form, to the surface of the photoconductor 5 as a lubricant supplying target, at the upstream side of the cleaning blade 151 in the direction in which the surface of the photoconductor 5 moves. The detail of the lubricant coating device 16 will be described later. Toner remaining on the surface of the photoconductor 5 after completing the primary transfer is collected from the surface of the photoconductor 5 by the lubricant coating device 16, and at the same time, the lubricant is coated on the surface of the photoconductor 5. Thereafter, the toner still remaining on the surface of the photoconductor 5 is scraped off with the cleaning blade 151. In this embodiment, the lubricant coating device 16 is housed in the cleaning device 15. However, the lubricant coating device 16 may be constructed in a different unit separately from the cleaning device 15.

Each of the development devices 10A, 10B, 10C and 10D includes a development roller opposing the photoconductor 5, a screw conveying developer while stirring the developer, a toner density sensor, etc. In this embodiment, two-component developer including toner and magnetic carriers is used for the developer. Therefore, the development roller includes a sleeve configured to rotate and a magnet fixedly arranged inside of the sleeve. Toner is replenished to each of the development devices 10A, 10B, 10C and 10D from a toner replenishment device, not shown, according to an output of the toner density sensor. For the magnetic carriers, generally, a core material itself or a core material having a covering layer is used. In this embodiment, a carrier using a ferrite or a magnetite as the core material and covered by a resin layer is used. The particle diameter of the core material is about 20-65 μm, preferably about 30-60 μm. For the resin used for covering the core material, styrene resin, acrylic resin, fluorine resin, silicone resin, or a mixture or copolymer of those resins may be used. The covering layer may be formed by coating the resin on the surface of the core material particle using a known method such as the spraying method, the dipping method, etc.

Now, the operation of the printer 1 is described.

By starting an image forming operation, the photoconductors 5 respectively rotate in the clockwise direction in figure. The surfaces of the photoconductors 5 are uniformly charged with the charging rollers 141, and thereafter, laser lights corresponding to respective colors are illuminated on the charged surfaces of the photoconductors 5 by the writing unit 6. A laser light corresponding to an image of magenta is illuminated on the surface of the photoconductor 5 of the image formation unit 2A, a laser light corresponding to an image of cyan is illuminated on the surface of the photoconductor 5 of the image formation unit 2B, a laser light corresponding to an image of yellow is illuminated on the surface of the photoconductor 5 of the image formation unit 2C, and a laser light corresponding to an image of black is illuminated on the surface of the photoconductor 5 of the image formation unit 2D. Thereby, latent images corresponding to image data of respective colors are formed on the surfaces of the photoconductors 5. The latent images on the photoconductors 5 arrive at positions opposing the development devices 10A, 10B, 10C and 10D with rotation of the photoconductors 5, where the latent images are developed with toners of magenta, cyan, yellow and black into toner images of respective colors.

On the other hand, a transfer sheet is fed from the sheet feeding cassette 11 or 12 by the corresponding sheet separating/feeding device 55 or 56, and the transfer sheet is conveyed in the timing to match with the toner images formed on the photoconductors 5 by a registration roller pair 59 provided immediately before the transfer belt 31 in the direction in which the transfer sheet is conveyed. The transfer sheet is charged to the positive polarity by a sheet adsorbing roller 58 provided in the vicinity of the entrance of the transfer belt 31 and thereby the transfer sheet is electrostatically adsorbed to the surface of the transfer belt 31. While the transfer sheet is being conveyed in the state of being adsorbed to the transfer belt 31, the toner images of magenta, cyan, yellow and black are sequentially transferred onto the transfer sheet and thereby a full color toner image in which four color images have been superimposed is formed on the transfer sheet. The transfer sheet is then conveyed to the fixing device 9, where heat and pressure are applied to the transfer sheet and thereby the full color toner image is melted and fixed to the transfer sheet. Thereafter, according to a designated mode, the transfer sheet is discharged onto the discharge tray 26 after passing the reverse discharging path 20, or conveyed from the fixing device 9 straightly to be directly discharged after passing the reversing unit 8. When the duplex mode has been selected, the transfer sheet is conveyed into the reverse conveyance path in the reversing unit 8, reversed to the duplex unit 7, and then conveyed to the image formation part where the image formation units 2A, 2B, 2C and 2D are provided, and after an image has been formed on the backside of the transfer sheet at the image formation part, the transfer sheet is discharged.

Next, the structure of the lubricant coating device 16 is described.

The lubricant coating device 16 in this embodiment includes, as illustrated in FIG. 3, a brush roller 161 serving as a supply member, a solid lubricant 162 in a rod shape long in the direction orthogonal to the sheet surface, and a pressing mechanism 163 serving as a pressing device. The rotation direction of the brush roller 161 is the direction in which the brush roller 161 is caused to rotate by rotation of the photoconductor 5. The brush roller 161 is formed of a resin material such as nylon, acryl, etc., the volume resistivity of which has been adjusted to be in the range from $1\times10^3$ Ωcm to $1\times10^8$ Ωcm by adding a resistance controlling material such as carbon black, etc. The solid lubricant 162 is pressed against the brush roller 161 by the pressing mechanism 163. As the material for the solid lubricant 162, fatty acid metallic salts may be used, such as, lead oleate, zinc oleate, copper oleate, zinc stearate, cobalt stearate, iron stearate, copper stearate, zinc palmitate, copper palmitate, zinc linoleate, etc. Among those fatty acid metallic salts described above, zinc stearate is most preferable. Further, the solid lubricant 162 made in a solid form by filling zinc stearate, calcium stearate, etc. in a solid form molding body may be also used.

The brush roller 161 is driven to rotate and thereby a lubricant is scraped off the solid lubricant 162 in minute particles, and the lubricant in minute particles is coated on the surface of the photoconductor 5 by the brush roller 161. Thereafter, due to contact of the surface of the photoconductor 5 and the cleaning blade 151, the coated lubricant on the surface of the photoconductor 5 is pressed and spread in a thin film state. Thereby, the friction coefficient of the surface of the photoconductor 5 decreases. Because the film of the lubricant adhered to the surface of the photoconductor 5 is very thin, it never occurs that the film of the lubricant hampers charging of the photoconductor 5 with the charging device 14.

Figure 4:
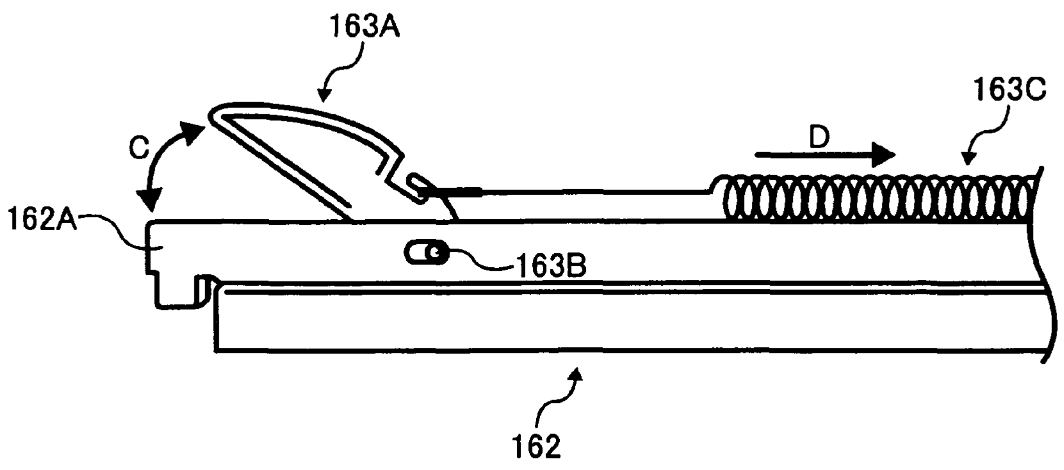
FIG. 4 is a partially enlarged diagram illustrating the principal part of a pressing mechanism provided in the printer.

FIG. 4 is a partially enlarged diagram illustrating the principal part of the pressing mechanism 163 in this embodiment. FIG. 4 illustrates the pressing mechanism 163 viewed from the direction orthogonal to both of the longitudinal direction of the solid lubricant 162 (the left-to-right direction in figure) and the direction in which the solid lubricant 162 is pressed against the brush roller 161 (the vertical direction in figure), and in figure, only the part of the pressing mechanism 163 at one end side in the longitudinal direction of the solid lubricant 162 is illustrated. The structure of the part of the pressing mechanism 163 at the other end side of the solid lubricant 162 is substantially the same as that of the part of the pressing mechanism 163 illustrated in figure.

In this embodiment, a lubricant holding member 162A holding the part of the solid lubricant 162 on the opposite side of the surface contacting the brush roller 161 (the lower side surface in figure) is provided. The lubricant holding member 162A holds the solid lubricant 162 through the longitudinal direction thereof. A movable member 163A serving as a pressing member is attached to each end part in the longitudinal direction of the lubricant holding member 162A. One end (the attaching end) of the movable member 163A is rotatably attached to the lubricant holding member 162A, and the other end (the rotating end) of the movable member 163A is rotatable in the direction of the arrow "C" in figure around an attachment position 163B of the lubricant holding member 162A where the movable member 163A is attached. End parts of a spring 163C serving as a biasing device are attached to respective movable members 163A. Each movable member 163A obtains from the spring 163C a biasing force directing toward the center in the longitudinal direction of the lubricant holding member 162A, e.g., in the direction of the arrow "D" in figure. Due to this biasing force of the spring 163, the rotating end of the movable member 163A is biased in the direction of separating from the lubricant holding member 162A as illustrated in FIG. 4.

The lubricant holding member 162A holding the solid lubricant 162 is attached to the cleaning device 15 in the state that the movable members 163A and the spring 163C have been attached. When attaching the lubricant holding member 162A to the cleaning device 15, the lubricant holding member 162A is arranged, as illustrated in FIG. 3, between a casing internal wall 164 of the cleaning device 15 as a fixed member and the brush roller 161 in the state that the rotating ends of the movable members 163A have been rotated in the directions of approaching the lubricant holding member 162A while resisting against the biasing force of the spring 163C. With this configuration, the movable members 163A at both side ends of the lubricant holding member 162A receive the biasing force of the spring 163C and thereby press the casing internal wall 164 with even forces, so that the solid lubricant 162 held by the lubricant holding member 162A is pressed against the brush roller 161. Accordingly, the solid lubricant 162 is pressed against the brush roller 161 evenly in the longitudinal direction of the solid lubricant 162. Consequently, the quantity of the lubricant scraped off the solid lubricant 162 by the brush roller 161 as the brush roller 161 rotates and rubs the solid lubricant 162 is made even in the longitudinal direction of the solid lubricant 162, so that the lubricant can be coated on the surface of the photoconductor 5 evenly in the longitudinal direction thereof.

Further, the pressing mechanism 163 in this embodiment is advantageous in the following point also as compared with the background pressing mechanism illustrated in FIG. 1.

Figure 5:
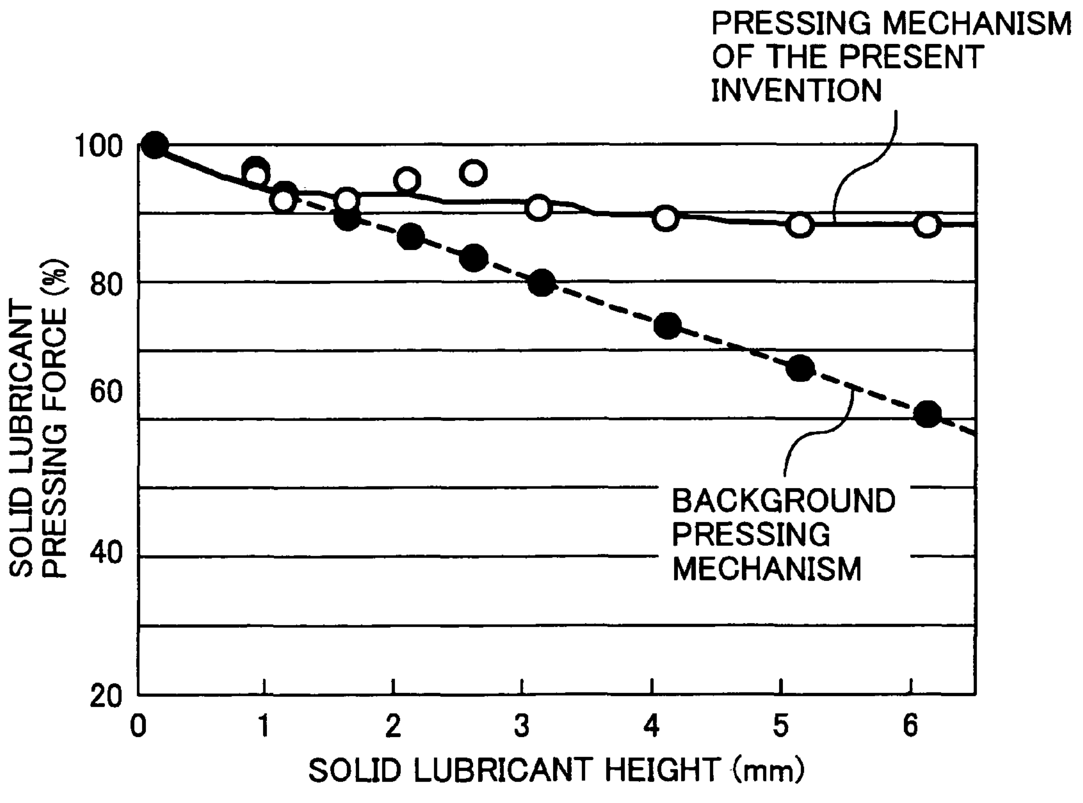
FIG. 5 is a graph illustrating a change over time in the pressing force of a solid lubricant when compared between the pressing mechanism of the present invention and the background pressing mechanism.

FIG. 5 is a graph illustrating a change over time in the pressing force of the solid lubricant 162 when compared between the pressing mechanism 163 in this embodiment and the background pressing mechanism of FIG. 1. The vertical axis indicates the ratio of the pressing force relative to an initial pressing force, and the horizontal axis indicates the height of the solid lubricant 162 (the dimension of the solid lubricant 162 in the direction in which the solid lubricant 162 is pressed against the brush roller 161).

In the background pressing mechanism of FIG. 1, as the solid lubricant 162 decreases in height by being used over time, the pressing force pressing the solid lubricant 162 gradually decreases. Therefore, the quantity of the lubricant scraped off the solid lubricant 162 by the brush roller 161 decreases over time, so that the change in the quantity of the lubricant supplied to the surface of the photoconductor 5 from the initial stage over time is relatively large. In contrast, in the pressing mechanism 163 in this embodiment, even if the solid lubricant 162 has changed in height by being used over time, decrease in the pressing force pressing the solid lubricant 162 can be suppressed, so that the change in the quantity of powdered lubricant supplied to the surface of the photoconductor 5 from the initial stage over time can be suppressed relatively small.

The reason that the above-described result can be obtained is as described below.

Generally, as the overall length of a spring is longer, the change in the biasing force of the spring during the time from the initial stage until when the solid lubricant 162 has been used up can be managed to be small relative to the amount of change in elongation of the spring during that time. In the background pressing mechanism of FIG. 1, as illustrated in figure, the spring 263 is set in the compressed state and it is necessary that the biasing (pushing out) direction of the spring 263 and the direction in which the solid lubricant 262 is pressed against a brush roller (supply member) agree. In this configuration, as the overall length of the spring 263 is longer, it is more difficult to cause the biasing direction of the spring 263 and the direction in which the solid lubricant 262 is pressed against the brush roller (supply member) to be agreed, so that there is a limit in increasing the overall length of the spring 263. In addition, in the background pressing mechanism of FIG. 1, an arrangement space corresponding to the length of the spring 263 must be secured in the diameter direction of the brush roller, leading to increasing the size of an apparatus in which the pressing mechanism is installed. Because of these reasons, in the background pressing mechanism of FIG. 1, the spring that is relatively short must be used, so that as indicated in FIG. 5, the change over time in the biasing force of the spring becomes relatively large.

In contrast, in the pressing mechanism 163 in this embodiment, as illustrated in FIG. 4, the spring 163C is set in the elongated state, and the solid lubricant 162 is pressed against the brush roller 161 by the biasing force (pulling force) of the spring 163C. Therefore, even if the overall length of the spring 163C is increased, the problem occurred in the background pressing mechanism does not occur. Further, the spring 163C is set such that the longitudinal direction of the spring 163C agrees with the longitudinal direction of the solid lubricant 162, i.e., the axial direction of the brush roller 161. Accordingly, even if the overall length of the spring 163C is increased, it never occurs that the arrangement space for installing the spring 163C increases in the diameter direction of the brush roller 161, so that it is not necessary to increase the size of an apparatus in which the pressing mechanism 163 is installed. Therefore, in the pressing mechanism 163 in this embodiment, the spring 163C that is much longer than the spring used in the background pressing mechanism is used. Consequently, the change over time in the biasing force of the spring 163C can be suppressed small as illustrated in FIG. 5.

Further, it owes to the following structure adopted in this embodiment that the effect that the change in the quantity of the powdered lubricant supplied to the surface of the photoconductor 5 from the initial stage over time can be suppressed small as illustrated in FIG. 5 is obtained.

That is, in this embodiment, it is constructed such that in response to that the solid lubricant 162 decreases due to being rubbed by the brush roller 161, the distance in the direction in which the solid lubricant 162 is pressed against the brush roller 161 between the point of force of each movable member 163A receiving the biasing force of the spring 163C and the point of action where the movable member 163A contacts the casing internal wall (contacted part) 164 changes, which will be explained more in detail below.

Figure 6:
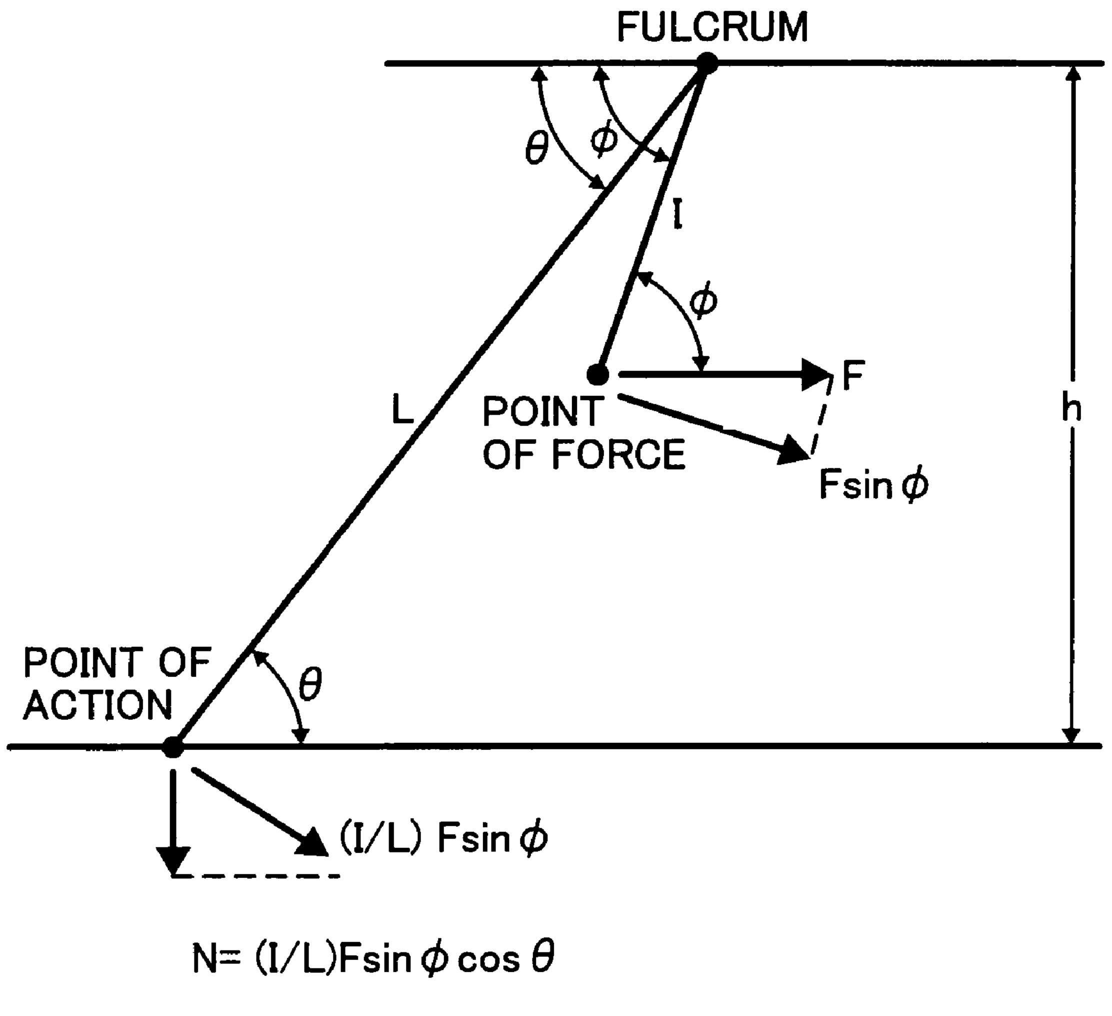
FIG. 6 is a diagram for explaining the force acting on a movable member of the pressing mechanism of the present invention.

FIG. 6 is a diagram for explaining the force acting on the movable member 163A of the pressing mechanism 163.

In this embodiment, the movable member 163A is configured to freely rotate around the attachment position 163B with the attachment position 163B serving as the fulcrum. Here, the point where the movable member 163A contacts the casing internal wall (contacted part) 164 is regarded as the point of action, and the length from the fulcrum to the point of action is denoted by the symbol "L". The distance between the fulcrum and the point of action in the direction in which the solid lubricant 162 is pressed is denoted by the symbol "h". The angle formed by the direction connecting the fulcrum and the point of action and the direction in which the solid lubricant 162 is pressed against the brush roller 161 (the vertical direction in figure) is expressed by $(\pi-\theta)$. Further, the point where the movable member 163A receives a biasing force "F" from the spring 163C is regarded as the point of force. The length from the fulcrum to the point of force is denoted by the symbol "I", and the angle formed by the direction connecting the fulcrum and the point of force and the direction of the biasing force F is denoted by $\phi$. At this time, a force N generated at the point of action, that is, a pressing force N pressing the solid lubricant 162, is expressed as follows; $N=(I/L)\times F\times\sin\phi\times\cos\theta$.

Here, in this embodiment, if the solid lubricant 162 decreases by being rubbed, the position of the point of force shifts toward right in figure and thereby the spring 163C is shrank, leading to decreasing in the biasing force F of the spring 163C. Consequently, if the solid lubricant 162 decreases by being rubbed, the biasing force F changes the force N generated at the point of action, i.e., the pressing force N, to be smaller. However, in this embodiment, the amount of decrease in the biasing force F as compared to the amount of decrease in the solid lubricant 162 (the amount of increase in the distance h) is much smaller than in the background pressing mechanism illustrated in FIG. 1. Accordingly, according to this embodiment, the amount of decrease in the pressing force N relative to the amount of decrease in the solid lubricant 162 (the amount of increase in the distance h) can be suppressed relatively small.

Further, if the solid lubricant 162 decreases by being rubbed by the brush roller 161, the distance h increases correspondingly to the amount of decrease in the solid lubricant 162, so that the angle $(\pi-\theta)$ formed by the direction connecting the fulcrum and the point of action and the direction in which the solid lubricant 162 is pressed against the brush roller 161 (the vertical direction in figure) decreases. That is, the angle $\theta$ increases. Accordingly, because $\cos\theta$ decreases as the sold lubricant 162 decreases by being rubbed, the force N generated at the point of action (the pressing force N) decreases correspondingly. However, in this embodiment, it is constructed such that if the solid lubricant 162 decreases by being rubbed, the angle $\phi$ formed by the direction connecting the fulcrum and the point of force and the direction of the biasing force F increases. Therefore, as the solid lubricant 162 decreases by being rubbed, $\sin\phi$ increases, and the force N generated at the point of action (the pressing force N) increases correspondingly. Consequently, the decrease in the force N due to the decrease in $\cos\theta$ can be offset by the increase in the force N due to the increase in $\sin\theta$.

Furthermore, in this embodiment, as illustrated in FIG. 4, a contacting part of the movable member 163A, that may contact the casing internal wall 164, is formed in a curved shape. Thereby, if the solid lubricant 162 decreases by being rubbed, the contacting place of the contacting part of the movable member 163A, that contacts the casing internal wall 163A, gradually changes. Accordingly, in this embodiment, if the solid lubricant 162 decreases by being rubbed, the length L from the fulcrum to the point of action increases. Here, increasing in the length L from the fulcrum to the point of action causes the force N generated at the point of action (i.e., the pressing force N) to be changed smaller. However, increasing in the length L from the fulcrum to the point of action causes the angle $\theta$ to be made smaller. Accordingly, the ratio of decrease in $\cos\theta$ decreasing as the solid lubricant 162 decreases by being rubbed can be suppressed relatively small.

As described above, if the solid lubricant 162 decreases by being rubbed and thereby the distance h increases, based upon this, the length L increases, the biasing force F decreases, $\sin\theta$ increases, and $\cos\theta$ decreases. However, by suppressing the ratio of decrease in the biasing force F small as compared with the background pressing mechanism as described above and at the same time by suppressing the ratio of decrease in $\cos\theta$ by adopting the structure that the length L from the fulcrum to the point of action gradually increases, the ratio of decrease in the pressing force N can be suppressed in a comprehensive manner as compared with the background pressing mechanism. Thus, according to this embodiment, even when the solid lubricant 162 has decreased by being rubbed, the amount of change in the force N generated at the point of action (the pressing force N) can be made relatively small, so that the effect that the change in the quantity of powdered lubricant supplied to the surface of the photoconductor 5 from the initial stage over time can be suppressed small is obtained.

To effectively transmit the biasing force F to the point of action, it is preferable that the angle $\phi$ is set in the range close to 90° and the angle $\theta$ is set in the range close to 0°. However, as the angle $\theta$ is closer to 0°, the length L must be made longer, so that because of the relation to the layout of an apparatus in which the pressing mechanism 163 is installed, the angle $\theta$ cannot be set close to 0° too much.

Further, the pressing mechanism 163 in this embodiment is advantageous in the following point also as compared with the background pressing mechanism illustrated in FIG. 1.

In the background pressing mechanism also, as described with respect to this embodiment, a lubricant holding member holding the solid lubricant 262 is attached to the cleaning device 15 in the state that two springs 263 have been attached to the lubricant holding member. In the background pressing mechanism, when attaching the lubricant holding member to the cleaning device 15, it is necessary that free ends of the springs 263 fixed to both side end parts in the longitudinal direction of the solid lubricant 262 are positioned at predetermined attaching positions on the casing internal wall 164 of the cleaning device 15, respectively. The free ends of the springs 263 are easily dislocated in the direction in which the springs 263 are positioned only by receiving small forces, so that it is not so easy to position the free ends of the springs 263 at the predetermined attaching positions and the workability in the attaching operation is inferior. In contrast, in the pressing mechanism 163 in this embodiment, the rotating ends of the movable members 163A are positioned at predetermined attaching positions when attaching the pressing mechanism 163 to the cleaning device 15. Because the rotating ends of the movable members 163A are not easily dislocated in the direction in which the rotating ends of the movable members 163A are positioned, the workability in the attaching operation is greatly enhanced.

Figure 7:
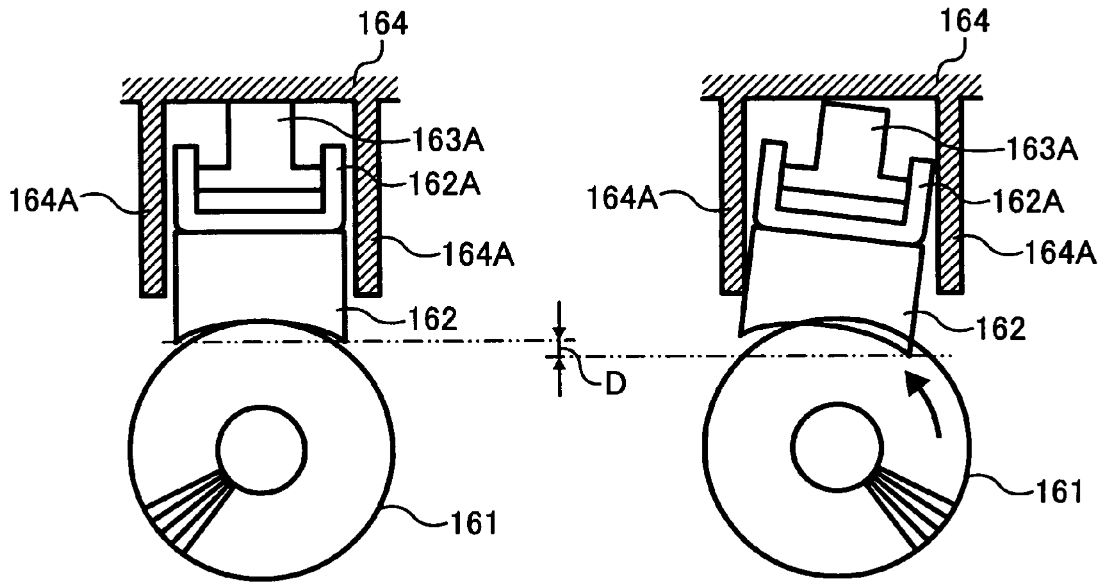
FIG. 7 is a cross section illustrating states of an example of the pressing mechanism when a brush roller is in the stationary state and when the brush roller is in the driven state.

FIG. 7 illustrates states of an example of the above-described pressing mechanism 163 when the brush roller 161 is in the stationary state and when the brush roller 161 is in the driven state, the state when the brush roller 161 is in the stationary state being illustrated in the left side part in figure and the state when the brush roller 161 is in the driven state being illustrated in the right side part in figure. FIG. 7 is a cross section at a virtual plane including both of the direction of the force the solid lubricant 162 receives from the brush roller 161 by being rubbed by the brush roller 161 (the left-to-right direction in figure) and the direction in which the solid lubricant 162 is pressed against the brush roller 161 (the vertical direction in figure).

In this embodiment, to regulate the solid lubricant 162 from being dislocated in the direction of the force the solid lubricant 162 receives from the brush roller 161 (the left-to-right direction in figure), two regulation parts 164A are provided on the casing internal wall 164. The pressing mechanism 163 is fit between these regulation parts 164A and thereby the solid lubricant 162 is regulated from being dislocated in the left-to-right direction in figure by being rubbed by the brush roller 161.

Here, in the example illustrated in FIG. 7, the casing internal wall 164 serving as the contacted part is flat, and the contacting part of the movable member 163A contacting the casing internal wall 164 is configured to have a certain width in the direction of the force the solid lubricant 162 receives from the brush roller 161 by being rubbed by the brush roller 161 (the left-to-right direction in figure). Consequently, when the brush roller 161 is in the stationary state, as illustrated in the left side part in FIG. 7, the movable member 163A is in contact with the casing internal wall 164 at the whole area in the widthwise direction (the left-to-right direction in figure) of the contacting part thereof. However, because there exists some gap between the regulation part 164A and the solid lubricant 162 or the lubricant holding member 162A holding the solid lubricant 162, when the brush roller 161 is driven to rotate, the solid lubricant 162 is dislocated in the left-to-right direction in figure by receiving a rubbing force from the brush roller 161. Consequently, when the brush roller 161 is in the driven state, the movable member 163A contacts the casing internal wall 164 only at one end part in the widthwise direction of the contacting part thereof as illustrated in the right side part in FIG. 7. Thereby, the maximum dislocating amount "D" of the solid lubricant 162 from the state that the brush roller 161 is in the stationary state illustrated in the left side part in FIG. 7 is as illustrated in figure.

As the maximum dislocating amount D is greater, the encroaching amount of the solid lubricant 162 into the brush roller 161 increases and thereby the lubricant larger in quantity than as initially planned is supplied to the photoconductor 5. Consequently, the consumption amount of the lubricant increases. Further, as the maximum dislocating amount D is greater, the load to the motor driving the brush roller 161 increases, and further, the vibration amount of the brush roller 161 increases and thereby image deterioration due to bounding becomes easy to occur. Furthermore, as the maximum dislocating amount D is greater, coming off and/or falling down of bristles of the brush roller 161 become easy to occur, so that the life of the brush roller 161 becomes shorter. Accordingly, it is desired that the maximum dislocating amount D is small as much as possible.

By making the gap between the regulation part 164A and the solid lubricant 162 or the lubricant holding member 162A smaller, the maximum dislocating amount D can be made smaller. However, taking into consideration the workability in attaching the solid lubricant 162 and the pressing mechanism 163, the gap is necessary to be in a certain breadth, so that there is a limit in making the gap smaller.

Figure 8:
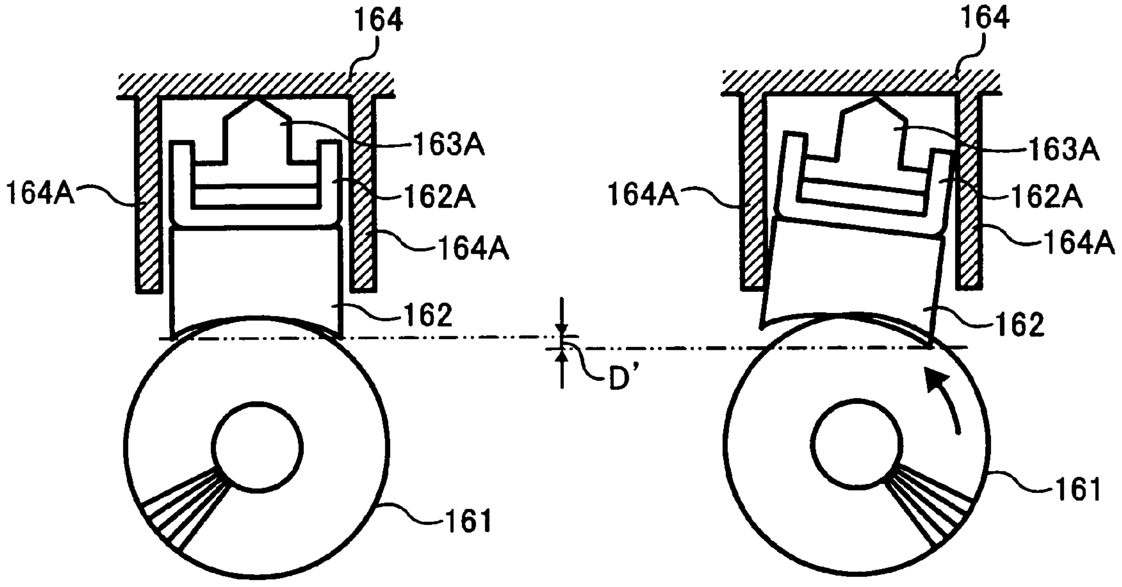
FIG. 8 is a cross section illustrating states of another example of the pressing mechanism when a brush roller is in the stationary state and when the brush roller is in the driven state.

FIG. 8 illustrates states of another example of the pressing mechanism 163 when the brush roller 161 is in the stationary state and when the brush roller 161 is in the driven state.

In this example, the casing internal wall 164 as the contacted part with which the movable member 163A is brought into contact is flat, and the contacting part of the movable member 163A contacting the casing internal wall 164 is formed in cross section in a spire shape that the center portion thereof in the left-to-right direction in figure protrudes. Thereby, the movable member 163A contacts the casing internal wall 164 at the spire part thereof when the brush roller 161 is in the stationary state and when the brush roller 161 in the driven state as well. Consequently, the maximum dislocating amount D' of the solid lubricant 162 when the brush roller 161 is turned into the driven state illustrated in the right side part in FIG. 8 from the stationary state illustrated in the left side part in FIG. 8 is as illustrated in figure, which is smaller than the maximum dislocation amount D in the example illustrated in FIG. 7. Accordingly, as compared with the example illustrated in FIG. 7, the encroaching amount of the solid lubricant 162 into the brush roller 161 is suppressed smaller and thereby it can be suppressed that the consumption amount of the lubricant increases. Further, it can be suppressed that the load to the motor driving the brush roller 161 increases, and also, image deterioration can be suppressed by suppressing the degree of bounding small. Furthermore, coming off and/or falling down of the bristles of the brush roller 161 become harder to occur, so that the life of the brush roller 161 can be made longer.

Figure 9:
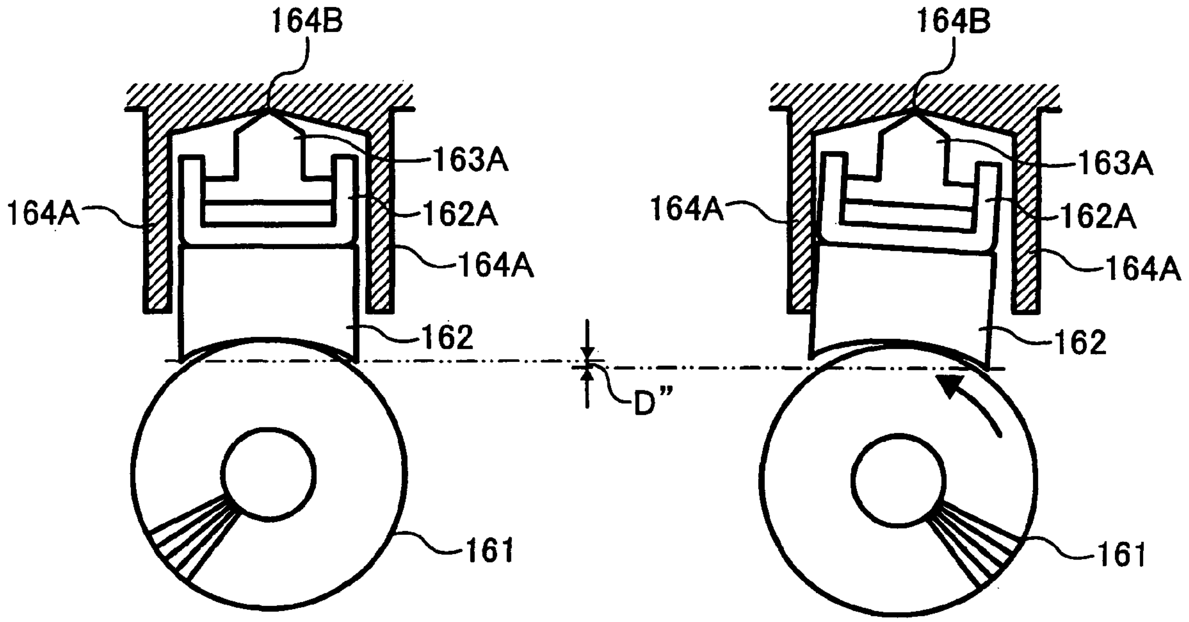
FIG. 9 is a cross section illustrating states of still another example of the pressing mechanism including a regulation when the brush roller is in the stationary state and when the brush roller is in the driven state.

FIG. 9 illustrates states of another example of the pressing mechanism 163 when the brush roller 161 is in the stationary state and when the brush roller 161 is in the driven state.

In this example, a regulation part 164B regulating the contacting part of the movable member 163A contacting the casing internal wall 164 from being dislocated in the left-to-right direction in figure is provided in the center part of the surface of the casing internal wall 164 in the left-to-right direction in figure. Specifically, the surface of the casing internal wall 164 with which the contacting part of each movable member 163A is brought into contact is formed to slope toward the center part thereof in the left-to-right direction in figure, and the center part functions as the regulation part 164B. By providing the regulation part 164B as described above, the contacting part of each movable member 163A is regulated from being dislocated in the left-to-right direction in figure by the regulation part 164B even when the brush roller 161 is in the driven state as illustrated in the right side part in FIG. 9 and is kept in substantially the same position as that in the stationary state illustrated in the left side part in FIG. 9, that is, at the center part in the left-to-right direction in figure. In this example, the maximum dislocating amount D" of the solid lubricant 162 when the brush roller 161 has been turned into the driven state illustrated in the right side part in FIG. 9 from the stationary state illustrated in the left side part in FIG. 9 is as illustrated in figure and is further smaller than the maximum dislocating amount D' in the example illustrated in FIG. 8. Accordingly, as compared with the example illustrated in FIG. 8, the encroaching amount of the solid lubricant 162 into the brush roller 161 is suppressed further smaller, and thereby it can be suppressed that the consumption amount of the lubricant increases. Further, it can be further suppressed that the load to the motor driving the brush roller 161 increases, and image deterioration can be also further suppressed by suppressing the degree of bounding small. Furthermore, coming off and/or falling down of the bristles of the brush roller 161 become harder to occur as compared with the example illustrated in FIG. 8, so that the life of the brush roller 161 can be made further longer.

Figure 10:
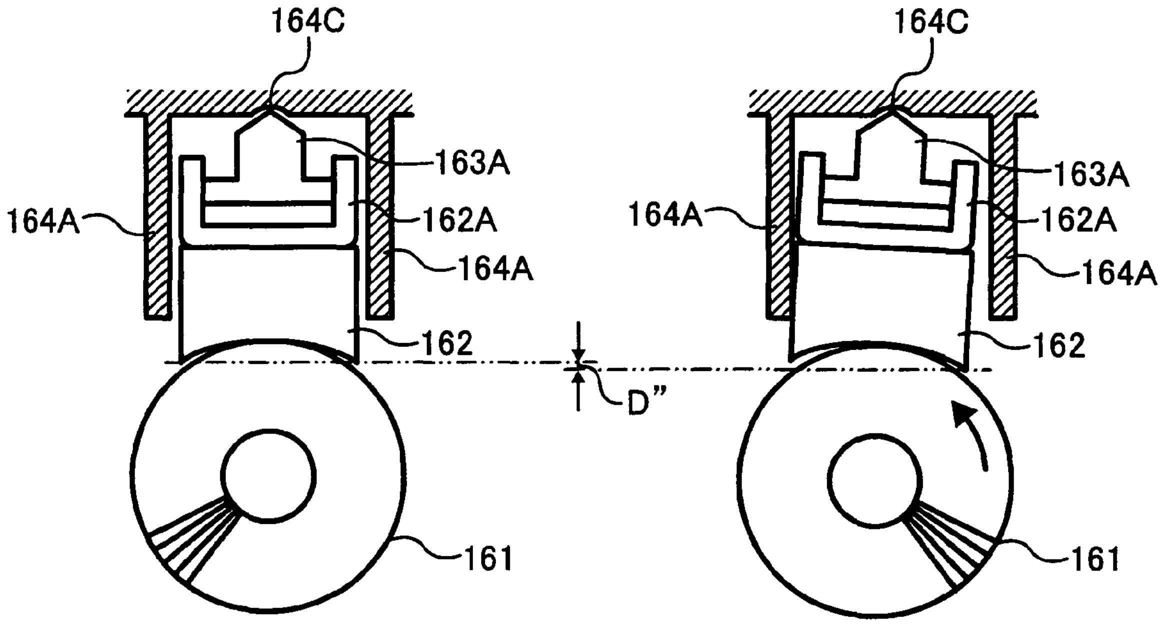
FIG. 10 is a cross section illustrating states of still another example of the pressing mechanism when the brush roller is in the stationary state and when the brush roller is in the driven state.

FIG. 10 illustrates states of another example of the pressing mechanism 163 including a variation of the regulation part regulating the contacting part of the movable member 163A from being dislocated in the left-to-right direction in figure.

A regulation part 164C as the variation of the regulation part is a hole or groove into which the contacting part of the movable member 163A is put, that is formed at the center portion in the left-to-right direction in figure of the flat surface of the casing internal wall 164 with which the contacting part of the movable member 163A is brought into contact. In this variation also, as in the example illustrated in FIG. 9, the contacting part of the movable member 163A is regulated from being dislocated in the left-to-right direction in figure even when the brush roller 161 is in the driven state as illustrated in the right side part in FIG. 10 and is kept in substantially the same position as that in the stationary state illustrated in the left side part in FIG. 10, that is, at the center part in the left-to-right direction in figure. Accordingly, the maximum dislocation amount D" of the solid lubricant 162 when the brush roller 161 has been put into the driven state illustrated in the right side part in FIG. 10 from the stationary state illustrated in the left side part in FIG. 10 is as illustrated in figure and is about the same as the maximum dislocation amount D" in the example illustrated in FIG. 9. Accordingly, the effects obtained in the example illustrated in FIG. 9 can be similarly obtained.

Figure 11:
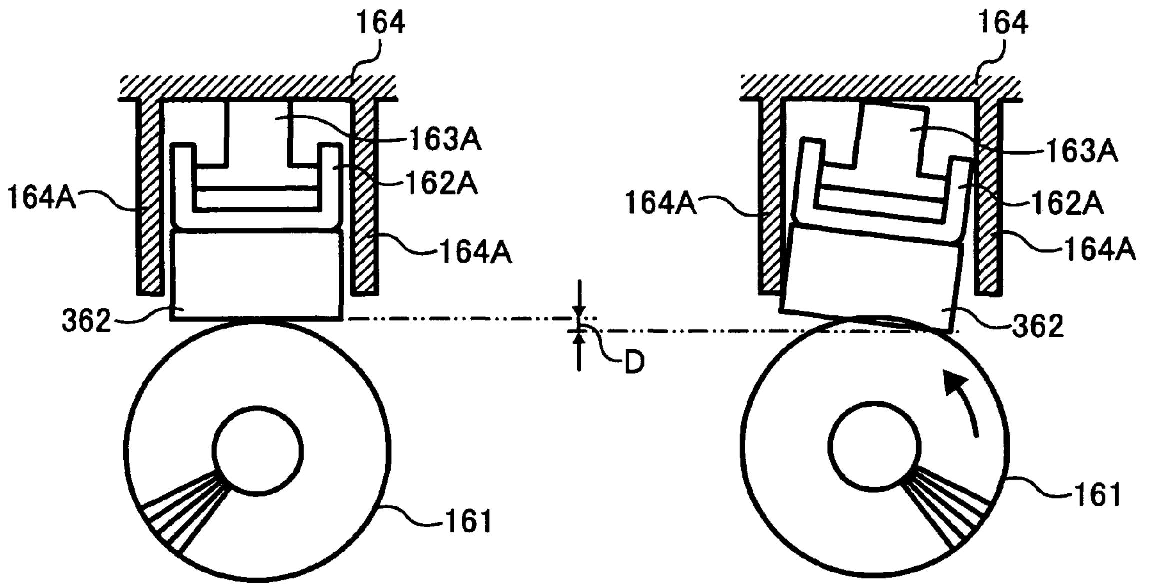
FIG. 11 is a cross section illustrating states of another example of the pressing mechanism including a solid lubricant in a square shape when the brush roller is in the stationary state and when the brush roller is in the driven state.
Figure 12:
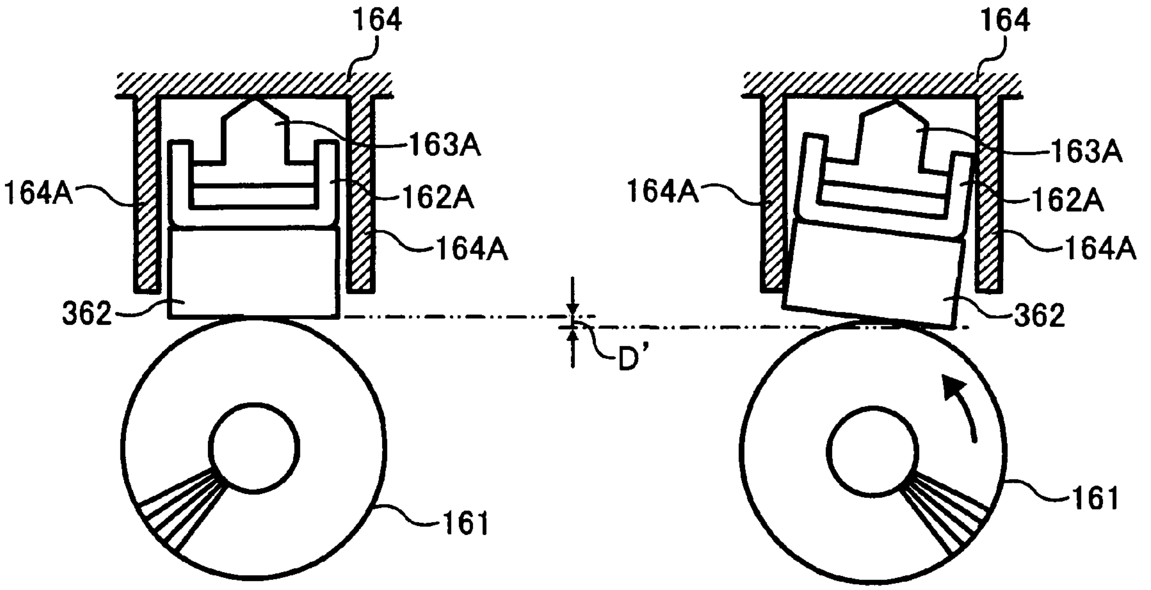
FIG. 12 is a cross section illustrating states of still another example of the pressing mechanism including the solid lubricant in a square shape when the brush roller is in the stationary state and when the brush roller is in the driven state.
Figure 13:
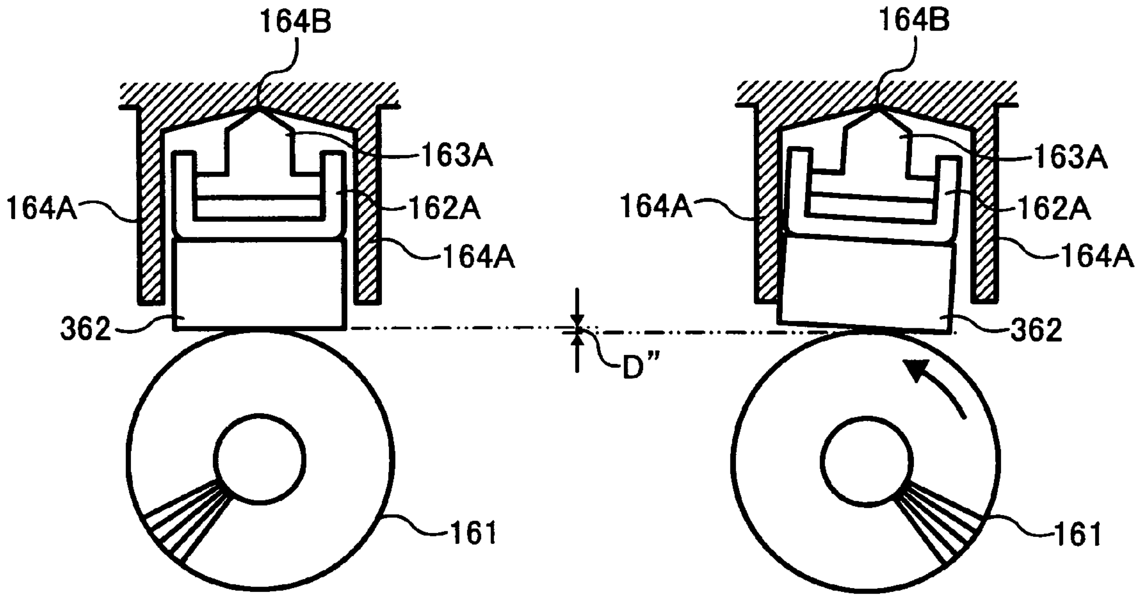
FIG. 13 is a cross section illustrating states of still another example of the pressing mechanism including the solid lubricant in a square shape when the brush roller is in the stationary state and when the brush roller is in the driven state.
Figure 14:
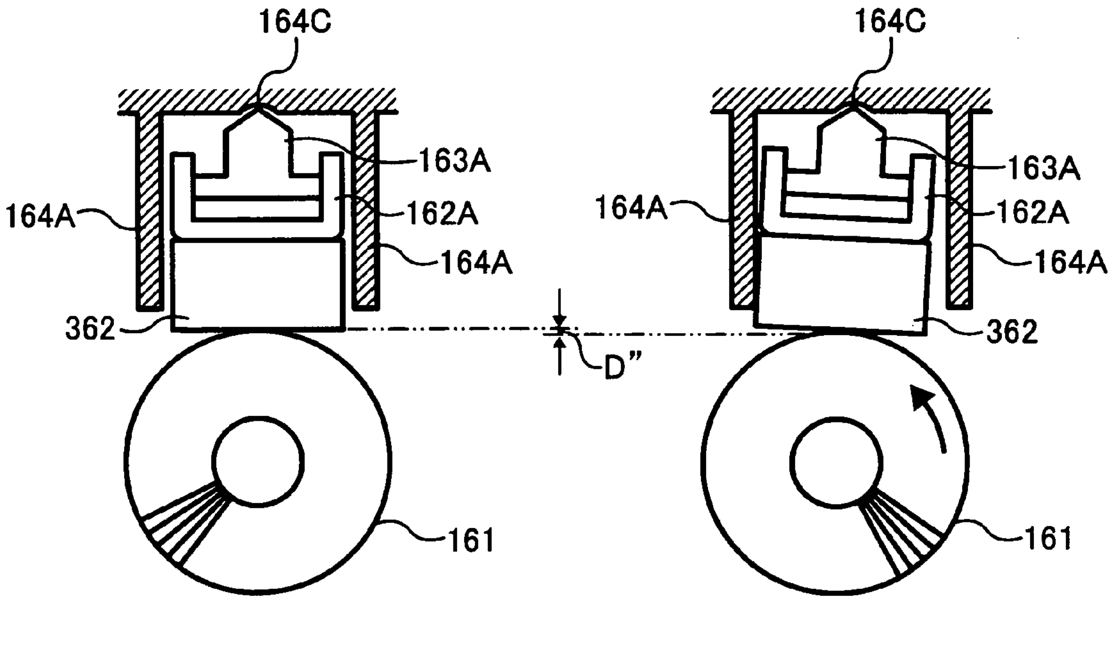
FIG. 14 is a cross section illustrating states of still another example of the pressing mechanism including the solid lubricant in a square shape when the brush roller is in the stationary state and when the brush roller is in the driven state.

In the above-described examples, to maintain the contacting condition of the brush roller 161 and the solid lubricant 162 substantially constant from the initial stage over time, the contacting part of the solid lubricant 162 contacting the brush roller 161 is formed in the initial state in a shape conforming to the outer circumference of the brush roller 161 (in an arc in cross section) as illustrated in figure. However, the shape of the contacting part of the solid lubricant 162 is not limited to such an arc shape, and may be formed otherwise. For example, as illustrated in FIG. 11, a solid lubricant 362 formed in a rectangular shape may be used. In this case also, by making the cross section of the contacting part of the movable member 163A in a spire shape as illustrated in FIG. 12, the maximum dislocating amount D' of the solid lubricant 362 when the brush roller 161 has been put into the driven state from the stationary state is smaller as compared with the example illustrated in FIG. 11. Further, as illustrated in FIG. 13 and FIG. 14, by providing the regulation part 164B or 164C at the center part in the left-to-right direction in figure of the surface of the casing internal wall 164, the maximum dislocating amount DC" of the solid lubricant 362 when the brush roller 161 has been put into the driven state from the stationary state is made further smaller than in the example illustrated in FIG. 12.

In this embodiment, the description has been made with respect to the case in which the casing internal wall 164 with which the contacting part of the movable member 163A is brought into contact is flat and the cross section of the contacting part of the movable member 163A is in a spire shape. However, by making the cross section of the casing internal wall 164 in a spire shape and the contacting part of the movable member 163A flat, the similar effects can be obtained. In this case, the regulation parts 164B and 164C are provided to the flat surface of the contacting part of the movable member 163A.

Further, in this embodiment, the similar effects can be obtained even when the above-described cross section of the movable member 163A or the casing internal wall 164 is an arc shape instead of the spire shape.

Figure 15A:
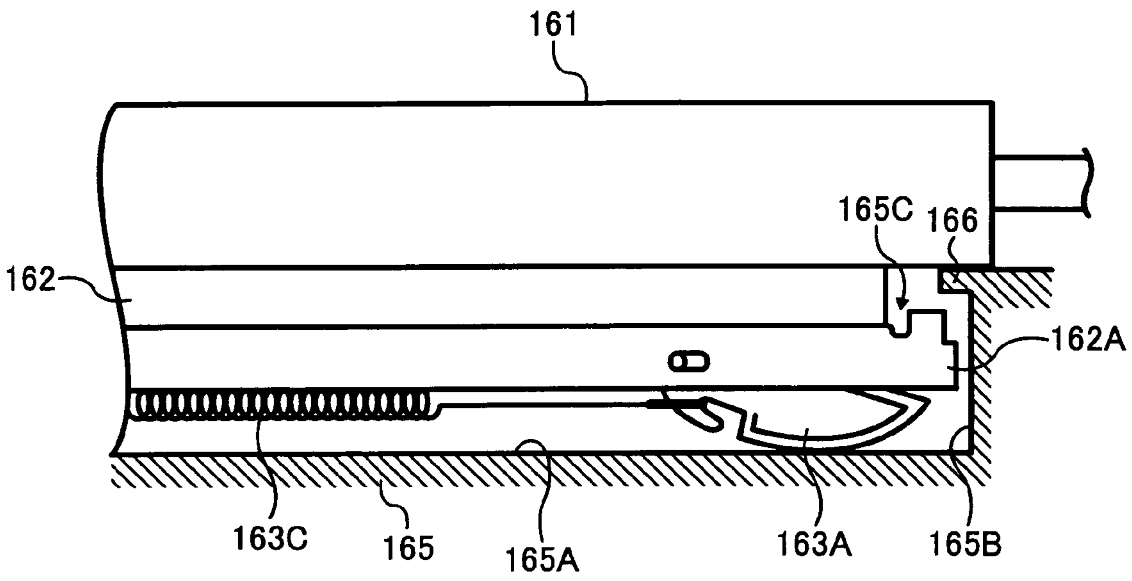
FIG. 15A is a cross section illustrating still another example of the pressing mechanism in the initial stage.
Figure 15B:
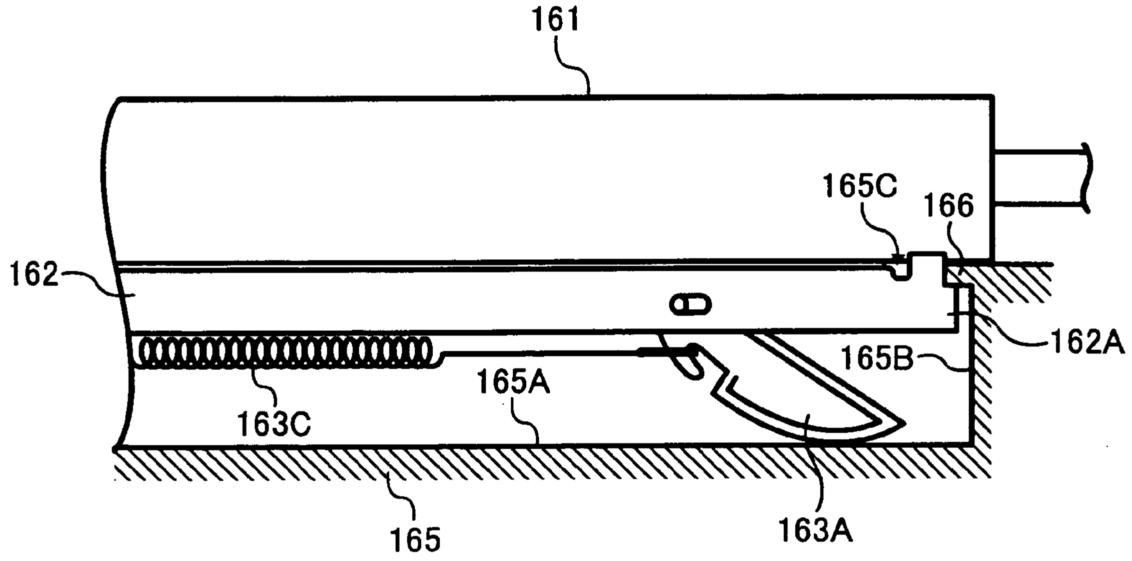
FIG. 15B is a cross section illustrating the example of the pressing mechanism of FIG. 15A when the solid lubricant has been used up.

FIG. 15A and FIG. 15B are diagrams for explaining another example of the pressing mechanism 163, FIG. 15A illustrating the state of the pressing mechanism 163 in the initial stage and FIG. 15B illustrating the state of the pressing mechanism 163 when the solid lubricant 162 has been used up.

In this example, the solid lubricant 162 held by the lubricant holding member 162A to which the spring 163C and two movable members 163A have been attached is accommodated in an accommodation case 165, and the accommodation case 165 accommodating the solid lubricant 162 held by the lubricant holding member 162A is attached to the cleaning device 15. That is, in this example, the solid lubricant 162 held by the lubricant holding member 162A to which the spring 163C and two movable members 163A have been attached is not directly attached to the casing internal wall 164 of the cleaning device 15, but is attached to the cleaning device 15 in the sate that the solid lubricant 162 held by the lubricant holding member 162A has been accommodated in the accommodation case 165. The accommodation case 165 includes, at the surface of the internal wall thereof, a receiving surface 165A receiving reaction forces applied to the movable members 163A in the direction (downward in figure) opposite the direction (upward in figure) in which the solid lubricant 162 is pressed against the brush roller 161, and a surface 165B regulating the lubricant holding member 162A from being dislocated in the directions orthogonal to the direction in which the solid lubricant 162 is pressed against the brush roller 161 (the left-to-right and front-to-back directions in figure) by contacting the lubricant holding member 162A, and further includes an opening part 165C, which the solid lubricant 162 held by the solid lubricant holding member 162A can pass, at the part opposing the receiving surface 165A.

In this example, the function of the casing internal wall 164 as the fixed member in the above-described examples is similarly performed by the accommodation case 165. Further, in this example, the pressing mechanism 163 is constituted of the two movable members 163A, the spring 163C, and the accommodation case 165.

Figure 16:
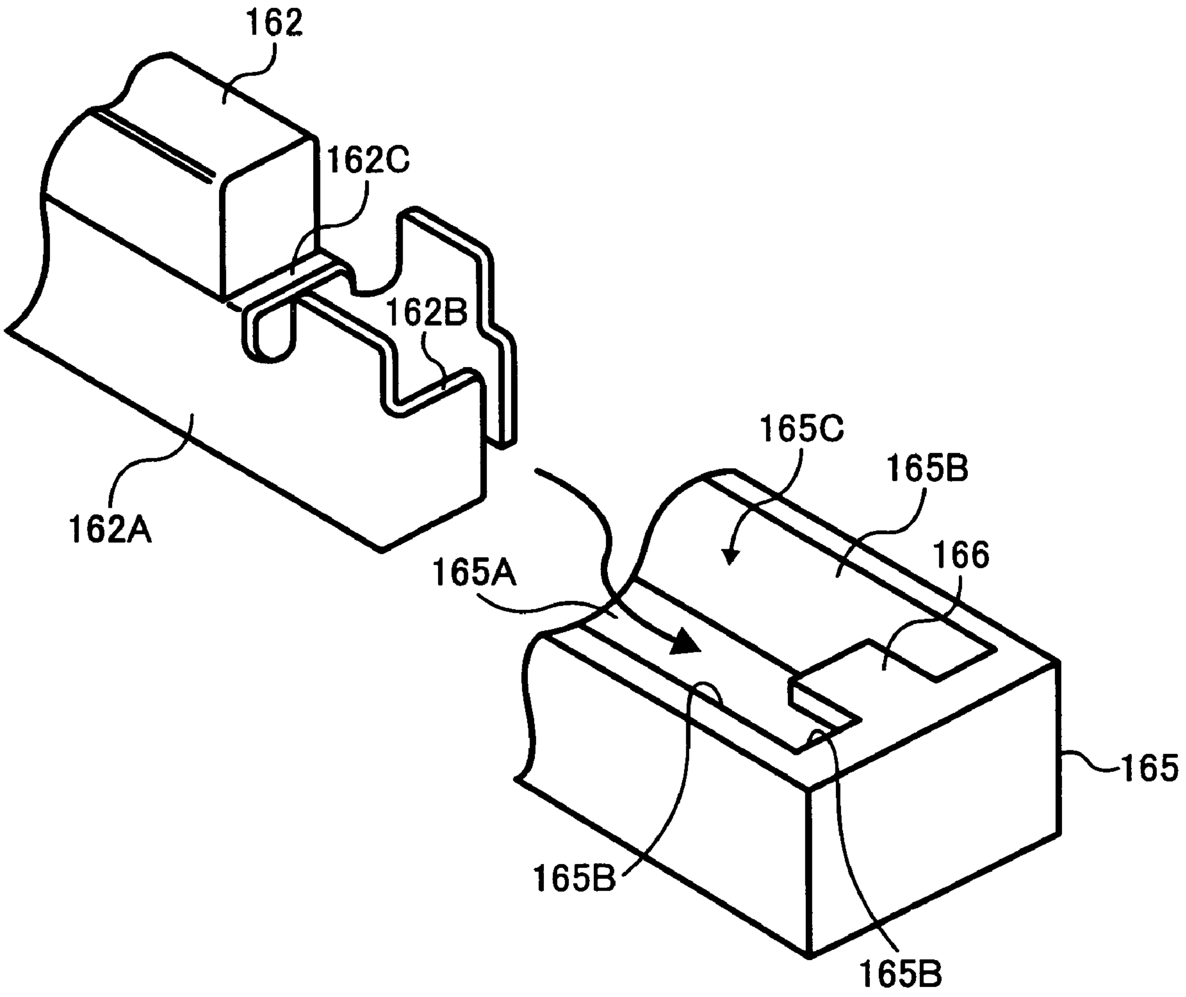
FIG. 16 is a diagram for explaining setting a lubricant holding member holding the solid lubricant in an accommodation case in the pressing mechanism of FIG. 15A and FIG. 15B.

When assembling the cleaning device 15, first, the solid lubricant 162 is attached to the lubricant holding member 162A to be held, and the spring 163C and the two movable members 163A are attached to the lubricant holding member 162A holding the solid lubricant 162. Then, the lubricant holding member 162A is set to the accommodation case 165 as illustrated in FIG. 16 and thereafter the accommodation case 165 is attached to the cleaning device 15, or the lubricant holding member 162A is set to the accommodation case 165 previously attached to the cleaning device 15 or integrally formed with the casing of the cleaning device 15. Thereafter, the brush roller 161 is built such that the solid lubricant 152 is pushed into the accommodation case 165. Here, when building the brush roller 161, the solid lubricant 162 set to the accommodation case 165 is pressed in the direction in which the solid lubricant 162 comes out of the accommodation case 165 by the biasing force of the spring 163C of the pressing mechanism 163, so that the workability in building the brush roller 161 is inferior and the productivity decreases. In this example, therefore, a protrusion 166 serving as a dislocation regulation member is provided at an edge part in the longitudinal direction of the opening part 165C of the accommodation case 165. The protrusion 166 regulates the lubricant holding member 162A from being dislocated beyond a predetermined regulation position (the position of the lubricant holding member 162A illustrated in FIG. 15B) in the direction in which the solid lubricant 162 is pressed against the brush roller 161 (the upward direction in figure) by contacting the lubricant holding member 162A.

Here, the protrusion 166 regulates at least one of the end parts in the longitudinal direction of the lubricant holding member 162A from being dislocated toward the side of the brush roller 161 beyond the protrusion 166. If a contacting part 162B of the lubricant holding member 162A, which is brought into contact with the protrusion 166, is positioned at the same height as that of the surface of the solid lubricant 162 on the opposite side of the surface rubbed by the brush roller 161, that is, the surface of the solid lubricant 162 contacting a solid lubricant holding surface 162C of the solid lubricant holding member 162A, the portion of the solid lubricant 162 corresponding to the thickness of the protrusion 166 cannot be used up, so that waste is incurred.

Accordingly, in this example, the position of the lubricant holding member 162A when the lubricant holding member 162A is regulated by the protrusion 166 from being dislocated in the direction in which the solid lubricant 162 is pressed against the brush roller 161 (the upward direction in figure), i.e., the predetermined regulation position, is set at the position where the lubricant holding member 162A is located when the solid lubricant 162 has been used up or at the position shifted in the direction in which the solid lubricant 162 is pressed against the brush roller 161 (the upward direction in figure), that is, toward the side of the brush roller 161. Specifically, the contacting part 162B of the lubricant holding member 162A is provided at the position shifted from the surface of the solid lubricant 162 on the opposite side of the surface rubbed by the brush roller 161 in the opposite direction (downward direction in figure) of the direction in which the solid lubricant 162 is pressed against the brush roller 161 by a distance greater than the thickness of the protrusion 166 provided at the edge part of the opening part 165C of the accommodation case 165. Thereby, when the solid lubricant 162 has been gradually decreased by being rubbed by the brush roller 161 and thereby dislocated together with the lubricant holding member 162A in the direction in which the solid lubricant 162 is pressed against the brush roller 161, the contacting part 162B of the lubricant holding member 162 never contacts the protrusion 166 until the whole part of the solid lubricant 162 is scraped off by the brush roller 161. Accordingly, the solid lubricant 162 can be used up to the last. Consequently, the effect that the volume of the solid lubricant 162 can be made small is obtained.

Next, still another example of the pressing mechanism 163 is described.

Figure 17A:
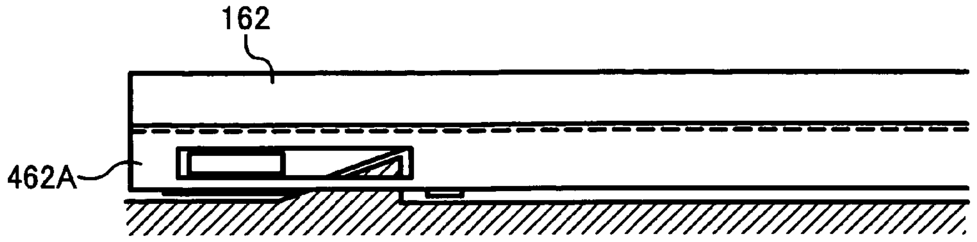
FIG. 17A is a partially enlarged diagram illustrating the principal part of still another example of the pressing mechanism.
Figure 17B:
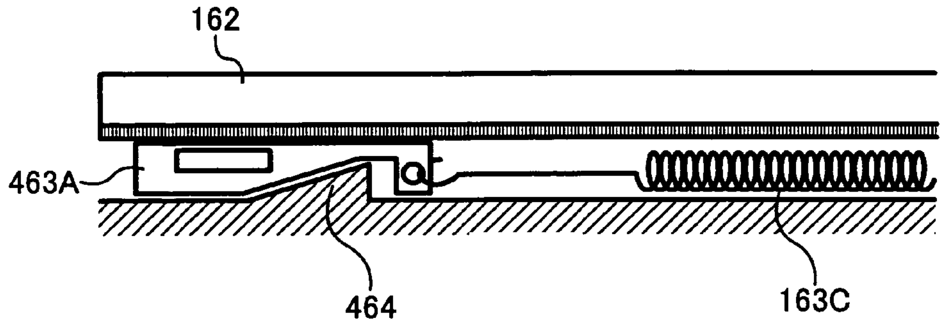
FIG. 17B is a diagram illustrating the internal structure of the pressing mechanism of FIG. 17A.

FIG. 17A is a partially enlarged diagram illustrating the principal part of the pressing mechanism 163 in this example, and FIG. 17B is a diagram illustrating the internal structure of the pressing mechanism 163. These diagrams illustrate the pressing mechanism 163 viewed from the direction orthogonal to both of the longitudinal direction of the solid lubricant 162 (the left-to-right direction in figure) and the direction in which the solid lubricant 162 is pressed against the brush roller 161 (the vertical direction in figure), and only the part of the pressing mechanism 163 at one end side in the longitudinal direction of the solid lubricant 162 is illustrated.

In the pressing mechanism 163 in this example, instead of the above-described two movable members 163A, two sliding member 463A are used as the pressing members. The sliding members 463A are attached to a lubricant holding member 462A so as to move in the directions in which they come close to each other by receiving the biasing force of the spring 163 serving as the biasing device. Further, the pressing mechanism 163 includes guiding surfaces 464 for guiding movement of the sliding members 463A. The guiding surfaces 464 may be the casing internal wall 164 of the cleaning device 15 or the receiving surface 165A of the above-described accommodation case 165. The guiding surfaces 464 slant such that the sliding members 463A are dislocated in the direction in which the solid lubricant 162 is pressed against the brush roller 161 (the upward direction in figure) with movement of the sliding members 463A. With such a configuration, the two sliding members 463A press the guiding surfaces 464 with even forces by receiving the biasing force of the spring 163C, and thereby the solid lubricant 162 held by the lubricant holding member 462A is pressed against the brush roller 161 as in the above-described examples. Accordingly, the solid lubricant 162 is pressed against the brush roller 161 evenly in the longitudinal direction thereof. Consequently, the lubricant scraped off the solid lubricant 162 by being rubbed by the brush roller 161 with rotation of the brush roller 161 is even in quantity in the longitudinal direction of the solid lubricant 162, so that the lubricant can be evenly coated on the surface of the photoconductor 5.

In this example also, as in the above-described examples, the spring 163C that is much longer than the spring used in the background pressing mechanism is used, and thereby the change over time in the biasing force of the spring 163C can be suppressed small as indicated in FIG. 5. Further, according to this example, because the angles of inclination of the guiding surfaces 464 are constant, if the spring 163C hardly changes in the biasing force thereof from the initial stage over time, then, the pressing forces of the sliding members 463A pressing the solid lubricant 162 hardly change. Accordingly, the effect that the change in the quantity of powdered lubricant supplied to the surface of the photoconductor 5 from the initial stage over time can be suppressed small is obtained.

As described above, the printer according to this embodiment is an image forming apparatus that includes the photoconductor 5 as an image bearing member and the lubricant coating device 16 as a lubricant supply device supplying a lubricant to the surface of the photoconductor 5 and that eventually transfers an image on the photoconductor 5 onto a transfer sheet as a recording member and thereby forms the image on the transfer sheet. The lubricant coating device 16 includes the solid lubricant 162, the brush roller 161 as a supply member contacting and rubbing the solid lubricant 162 and supplying a lubricant, scraped off the solid lubricant 162 by rubbing the solid lubricant 162, to the surface of the photoconductor 5, and the pressing mechanism 163 pressing the solid lubricant 162 against the brush roller 161. The pressing mechanism 163 includes the spring 163C as a biasing device and the movable members 163A as a plurality of pressing members receiving a biasing force of the spring 163C and thereby pressing places of the solid lubricant 162 at symmetrical positions with respect to the center of a part of the solid lubricant 162 contacting the brush roller 161, respectively. With such a structure, the biasing force of the spring 163C evenly acts on the movable members 163A, so that the pressing forces of the movable members 163A pressing the solid lubricant 162 are equal to each other. Accordingly, the solid lubricant 162 can be evenly pressed against the brush roller 161. The solid lubricant 162 can be evenly pressed against the brush roller 161 not only in the initial stage but also after the solid lubricant 162 has been gradually scraped by the brush roller 161 and thereby decreased over time. The similar effect can be obtained, without using the brush roller 161, in a construction in which the surface of the photoconductor 5 as a lubricant supplying target is caused to directly contact the solid lubricant 162 and a lubricant is scraped off the solid lubricant 162 by rubbing the solid lubricant 162 with the surface of the photoconductor 5.

Further, in this embodiment, the spring 163C generates the biasing force in the direction orthogonal to the direction in which the solid lubricant 162 is pressed against the brush roller 161, and the movable members 163A press the solid lubricant 152 by converting the direction of the biasing force of the spring 163C to the direction in which the solid lubricant 162 is pressed against the brush roller 161. With such a construction, the spring 163C that is longer than the spring used in the background pressing mechanism can be adopted as described above, and consequently, the change in the quantity of powdered lubricant supplied to the surface of the photoconductor 5 from the initial stage over time can be suppressed small.

Further, in this embodiment, the lubricant holding member 162A holding the solid lubricant 162 is provided, and it is constructed such that the movable members 163A press the solid lubricant 162 via the lubricant holding member 162A. Thereby, the workability in attaching the solid lubricant 162 to an apparatus is enhanced. However, the present invention is not limited to such a structure, and for example, it may be constructed such that the movable members 163A directly press the solid lubricant 162.

Further, in this embodiment, the spring 163C is used as the biasing device. However, other biasing devices, for example, an elastic member, such as a rubber, etc., may be used. Furthermore, in this embodiment, a pulling spring is used for the spring 163C. However, depending upon the structure of the pressing mechanism 163, a compressed spring may be used.

Figure 18:
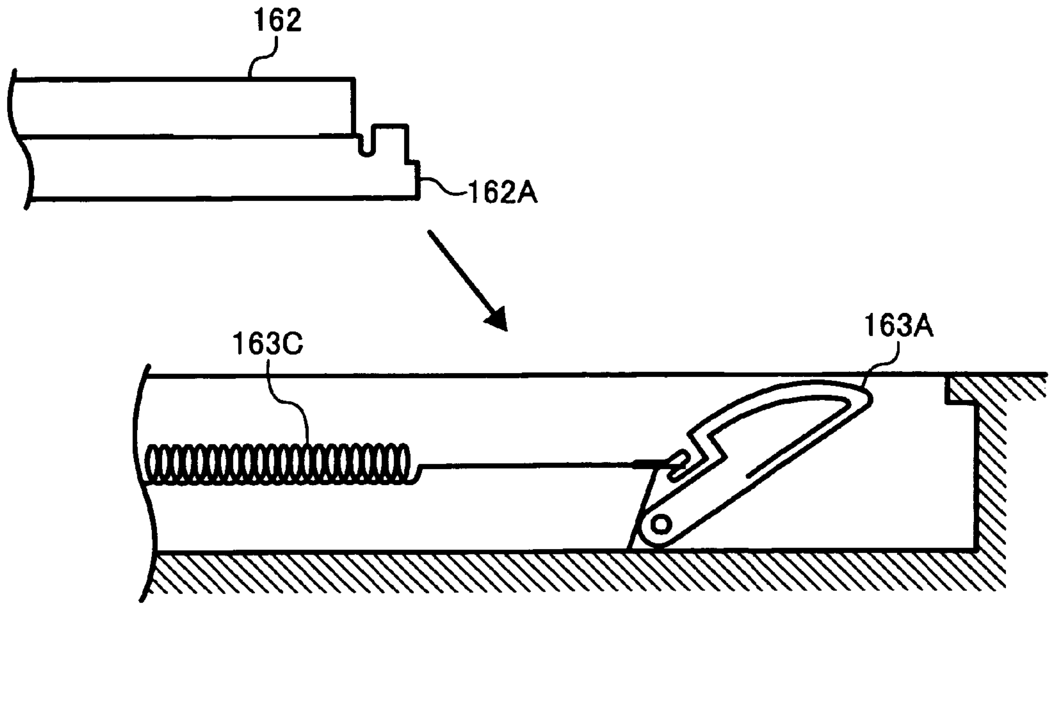
FIG. 18 is a diagram illustrating a state before the solid lubricant is set to the pressing mechanism in an example that the pressing mechanism is mounted on the main body side of an apparatus.

Furthermore, in this embodiment, the description has been made with respect to the structure that the pressing mechanism 163 is mounted at the side of the solid lubricant 162. However, as illustrated in FIG. 18, FIG. 19A, FIG. 19B, FIG. 20A, and FIG. 20B, it may be configured such that the pressing mechanism 163 is mounted at the main body side of an apparatus and the lubricant holding member 162A holding the solid lubricant 162 is detachable from the pressing mechanism 163. In this case, the workability in setting the solid lubricant 162 to the main body of the apparatus is greatly enhanced. That is, when the pressing mechanism 163 is mounted at the side of the solid lubricant 162, it is necessary to set the solid lubricant 162 and the pressing mechanism 163 while holding down the solid lubricant 162 biased by the pressing mechanism 163 in the direction of separating from the pressing mechanism 163 not to separate from the pressing mechanism 163, which is extremely inferior in workability. However, if it is constructed such that the pressing mechanism 163 is mounted at the main body side of the apparatus and the lubricant holding member 162A holding the solid lubricant 162 is detachable from the pressing mechanism 163, the solid lubricant 162 is set while resisting against the biasing force of the pressing mechanism 163 as illustrated in FIG. 18 and during that time, it is not necessary to hold down the solid lubricant 162 not to separate from the pressing mechanism 163.

Figure 19A:
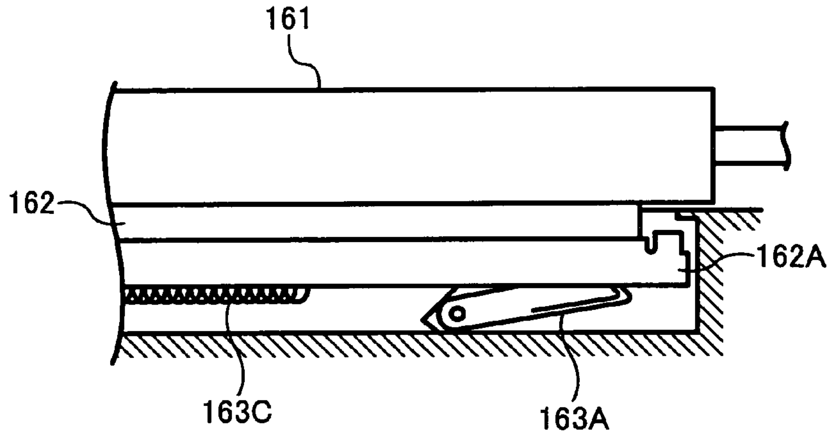
FIG. 19A is a diagram illustrating a state after the solid lubricant has been set to the pressing mechanism in the example of FIG. 18 when viewed from the direction orthogonal to the longitudinal direction of the solid lubricant.
Figure 19B:
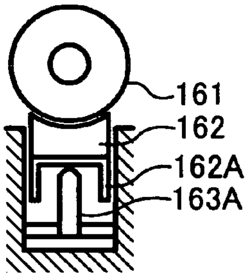
FIG. 19B is a diagram illustrating the state in FIG. 19A viewed from the longitudinal direction of the solid lubricant.

Further, even if it is constructed such that the pressing mechanism 163 is mounted at the main body side of the apparatus, as illustrated in FIG. 19A and FIG. 19B, the solid lubricant 162 can be pressed against the brush roller 161 as with the cases in the above-described examples in which the pressing mechanism 163 is provided at the side of the solid lubricant 162.

Further, in this embodiment, the description has been made with respect to the case that the direction in which the solid lubricant 162 is pressed against the brush roller 161 is downward in the vertical direction except the examples illustrated in FIG. 15A, FIG. 15B, FIG. 16, FIG. 17A, and FIG. 17B; However, it is more advantageous in the following points to make the direction in which the solid lubricant 162 is pressed against the brush roller 161 upward in the vertical direction as in the examples illustrated in FIG. 15A, FIG. 15B, FIG. 16, FIG. 17A, and FIG. 17B.

That is, when the direction in which the solid lubricant 162 is pressed against the brush roller 161 is downward in the vertical direction, the pressing force of the solid lubricant 162 to the brush roller 161 is the one in which the own weight of the solid lubricant 162 and the biasing force of the spring 163C have been added together. In this case, as the solid lubricant 162 decreases by being used over time, the own weight of the solid lubricant 162 decreases, so that the pressing force of the solid lubricant 162 to the brush roller 161 decreases. Further, as the solid lubricant 162 decreases by being used over time, the biasing force of the spring 163C decreases also, so that the pressing force of the solid lubricant to the brush roller 161 decreases. Accordingly, the pressing force of the solid lubricant 162 to the brush roller 161 gradually decreases by use over time. In contrast, when the direction in which the solid lubricant 162 is pressed against the brush roller 161 is upward in the vertical direction, the pressing force of the solid lubricant 162 to the brush roller 161 is the one in which the own weight of the solid lubricant 162 has been subtracted from the biasing force of the spring 163C. Therefore, if the solid lubricant 162 decreases by being used over time and thereby the weight of the solid lubricant 152 decreases, it leads to increasing the pressing force of the solid lubricant 162 to the brush roller 161. Consequently, the portion of the pressing force decreasing due to the decrease in the biasing force of the spring 163C by use over time and the portion of the pressing force increasing due to the decrease in the own weight of the solid lubricant 162 over time offset each other and thereby the change in the pressing force of the solid lubricant 162 to the brush roller 161 from the initial stage over time can be made relatively small.

Further, in this embodiment, as in the example illustrated in FIG. 15A and FIG. 15B, the protrusion 166 is provided as the dislocation regulation member contacting and thereby regulating the lubricant holding member 162A from being dislocated in the direction in which the solid lubricant 162 is pressed against the brush roller 161 (the upward direction in figure) beyond the predetermined regulation position.

Thereby, even when the hold on the solid lubricant 162 or the lubricant holding member 162A has been released before setting the solid lubricant 162 to the main body of the apparatus, the situation that the solid lubricant 162 comes off the pressing mechanism 163 due to the biasing force of the pressing mechanism 163 can be prevented. Thus, the troublesome operation of holding the solid lubricant 162, which is biased by the pressing mechanism 163 in the direction of separating from the pressing mechanism 163, not to separate from the pressing mechanism 163 becomes unnecessary when setting the solid lubricant 162 to the main body of the apparatus and the workability in setting the solid lubricant 162 to the main body of the apparatus is enhanced.

Figure 20A:
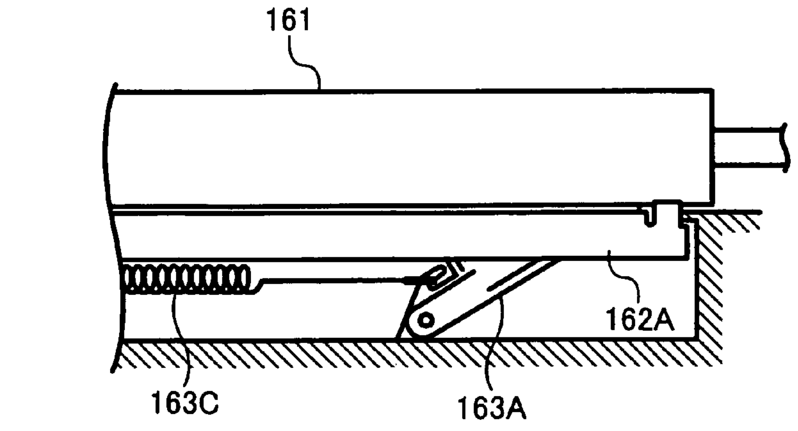
FIG. 20A is a diagram illustrating a state when the solid lubricant has been used up in the example of FIG. 18 viewed from the direction orthogonal to the longitudinal direction of the solid lubricant.
Figure 20B:
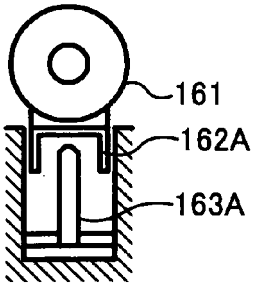
FIG. 20B is a diagram illustrating the state in FIG. 20A viewed from the longitudinal direction of the solid lubricant.

In particular, in this embodiment, as in the example illustrated in FIG. 15A and FIG. 15B, the predetermined regulation position is set at the position where the lubricant holding member 162A is located when the solid lubricant 162 has been used up or at the position shifted from that position in the direction in which the solid lubricant 162 is pressed against the brush roller 161 (the upward direction in figure). Thereby, the solid lubricant 162 can be used up to the last. Consequently, the effect that the volume of the solid lubricant 162 can be made relatively small is obtained. In the structure that the pressing mechanism 163 is provided at the main body side of the apparatus and the lubricant holding member 162A holding the solid lubricant 162 is detachable from the pressing mechanism 163 also, the solid lubricant 162 can be used up to the last as illustrated in FIG. 20A and FIG. 20B, so that the same effect can be obtained.

In particular, in the example illustrated in FIG. 15A and FIG. 15B, the pressing mechanism 163 includes the accommodation case 165 accommodating at least a part of the lubricant holding member 162A inside thereof, and the accommodation case 165 includes the receiving surface 165A receiving the reaction forces applied to the movable members 163A in the opposite direction of the direction in which the solid lubricant 162 is pressed against the brush roller 161 (the downward direction in figure), and the surface 165B contacting and thereby regulating the lubricant holding member 162A from being dislocated in the direction orthogonal to the direction in which the solid lubricant 162 is pressed against the brush roller 161, at the surface of the internal wall thereof, and the opening part 165C, which the solid lubricant 162 held by the lubricant holding member 162A can pass, at the part opposing the receiving surface 165A, and the protrusion 166 is provided at the edge part of the opening part 165C of the accommodation case 165. Thereby, the dislocation regulation device contacting and thereby regulating the lubricant holding member 162A from being dislocated beyond the predetermined regulation position in the direction in which the solid lubricant 162 is pressed against the brush roller 161 (the upward direction in figure) can be realized relatively simply. At this time, as in the example illustrated in FIG. 15A and FIG. 15B, by providing the contacting part 162B of the lubricant holding member 162A, which is brought into contact with the protrusion 166, at the position shifted from the surface of the solid lubricant 162 on the opposite side of the surface to be rubbed by the brush roller 161 in the opposite direction of the direction in which the solid lubricant 162 is pressed against the brush roller 161 (the downward direction in figure) by a distance equal to or greater than the thickness of the protrusion 166 provided at the edge part of the opening part 165C of the accommodation case 165, the protrusion 166 can be integrally formed with the accommodation case 165, so that a lower cost can be realized.

Further, in this embodiment, each movable member 163A in the pressing mechanism 163 is constructed to freely rotate around a fulcrum, and according as the solid lubricant 162 decreases by being rubbed by the brush roller 161, the angle formed by the direction connecting the point of action where the movable member 163A contacts the casing internal wall 164 and the fulcrum and the above-described direction in which the solid lubricant 162 is pressed against the brush roller 161 decreases, and at the same time, the angle formed by the direction connecting the point of force of the movable member 163A where the biasing force F of the spring 163C is received and the fulcrum and the direction of the biasing force F increases. Thereby, as described above, the effect that the change in the quantity of powdered lubricant supplied to the surface of the photoconductor 5 from the initial stage over time can be suppressed relatively small is obtained.

Furthermore, in this embodiment, as in the example illustrated in FIG. 17A and FIG. 17B, the pressing mechanism 163 includes the guiding surfaces 464 guiding movement of the two sliding members 463A moving in the directions in which the two sliding members 463A come close to each other by receiving the biasing force of the spring 163C, and the guiding surfaces 464 are slanted such that with movement of the sliding members 463A, the sliding member 463A are dislocated in the direction in which the solid lubricant 162 is pressed against the brush roller 161 (the upward direction in figure). With such a construction also, the effect similar to the one obtained in the structure using the above-described movable members 163A can be obtained. Further, the similar effect can be obtained in the structure in which a compressed spring is used as the spring 163C and the two sliding members 463A move in the directions in which they separate from each other.

Further, in this embodiment, the regulation parts 164A as the regulation members regulating the solid lubricant 162 from being dislocated in the direction of the force which the solid lubricant 162 receives by being rubbed by the brush roller 161 are provided, and the cross section of the contacting part of each movable member 163A contacting the casing internal wall 164 at the virtual plane including the direction of the force which the solid lubricant 162 receives and the direction in which the solid lubricant 162 is pressed against the brush roller 161 is in a spire shape. Thereby, as described above, as compared with the example illustrated in FIG. 7, the encroaching amount of the solid lubricant 162 into the brush roller 161 can be suppressed small and thereby increasing the consumption amount of the solid lubricant 162 can be suppressed. Further, increasing the load to the motor driving the brush roller 161 can be suppressed, and the degree of bounding can be suppressed relatively small and thereby image deterioration can be suppressed. Furthermore, coming off and/or falling down of the bristles of the brush roller 161 become harder to occur, so that the life of the brush roller 161 can be made longer.

In particular, as illustrated in FIG. 9, the regulation part 164B, which is the groove for regulating the spire-shaped part of each movable member 163A from being dislocated in the left-to-right direction in figure by the force the solid lubricant 162 receives by being rubbed by the brush roller 161, is provided in the receiving part of the casing internal wall 164 where the spire-shaped part of each movable member 163A is received. Thereby, as described above, the encroaching amount of the solid lubricant 162 into the brush roller 161 is suppressed relatively small, so that it is further prevented that the consumption amount of the lubricant increases.

In particular, by constructing such that the cross section of the regulation part 164B is in a V shape and the spire-shaped part of each movable member 163A is received at the bottom part of the regulation part 164B, which is the tip part of the V-shaped regulation part 164B, the spire-shaped part of each movable member 163A can be regulated from being dislocated in the left-to-right direction in figure by the force the solid lubricant 162 receives by being rubbed by the brush roller 161, and at the same time, the advantage described next can be obtained. That is, in this embodiment, as the solid lubricant 162 decreases, each movable member 163A is dislocated in the longitudinal direction of the solid lubricant 162 (the cross direction in figure), and in the example illustrated in FIG. 7, because the contact area of the movable member 163A with the casing internal wall 164 is relatively large and thereby the friction force is increased, smooth dislocation of the movable member 163A in the longitudinal direction of the solid lubricant 162 becomes difficult. In this case, it becomes difficult to apply an even pressing force to the solid lubricant 162. In contrast, in the example illustrated in FIG. 9, the contact area of the movable member 163A with the casing internal wall 164 is extremely small and thereby the friction force becomes relatively small, so that smooth dislocation of the movable member 163A in the longitudinal direction of the solid lubricant 162 is enabled and consequently it becomes easier to apply the even pressing force to the solid lubricant 162.

Figure 21A:
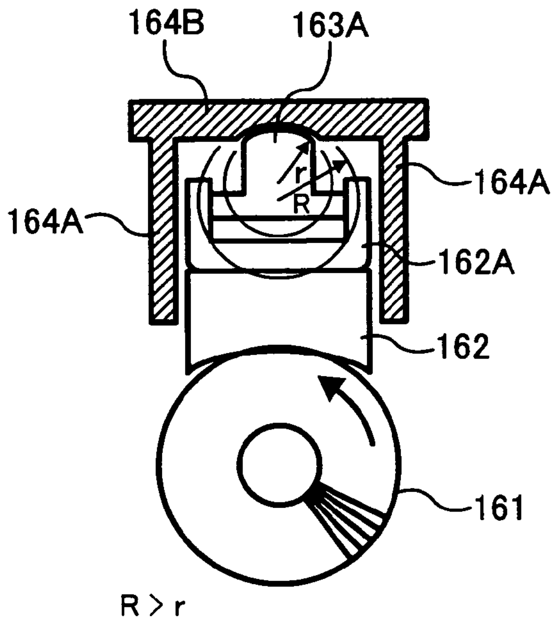
FIG. 21A is a cross section illustrating still another example of the pressing mechanism when the brush roller is in the stationary state.
Figure 21B:
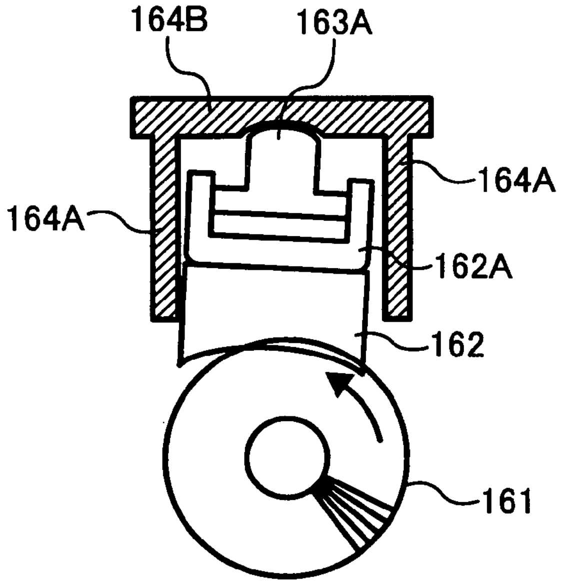
FIG. 21B is a cross section illustrating the example of the pressing mechanism of FIG. 21A when the brush roller is in the driven state.

The above-described effects can be similarly obtained even when the cross section of the contacting part of each movable member 163A is formed in an arch shape. In particular, by making the regulation part 164B in the surface of the casing internal wall 164 as the contacted part in an arc shape also as illustrated in FIG. 21A and FIG. 21B, even when the brush roller 161 is in the driven state illustrated in FIG. 21B, the arc-shaped part of each movable member 163A is regulated from being dislocated in the left-to-right direction in figure by the regulation part 164B and is kept in substantially the same position as that in the stationary state illustrated in FIG. 21A, i.e., at the center in the left-to-right direction in figure. Accordingly, as in the example illustrated in FIG. 9, the maximum dislocation amount of the solid lubricant 162 when the brush roller 161 has been turned into the driven state from the stationary state can be made relatively small. Further, it is preferable that a curvature radius "R" of the arc shape of the regulation part 164B is greater than a curvature radius "r" of the arc shape of each movable member 163A. The reason is because as in the case that the regulation part 164B and the contacting part of each movable member 163A are spire-shaped, while suppressing the maximum dislocation amount of the solid lubricant 162 relatively small, by making the contact area of each movable member 163A with the regulation part 164B relatively small and thereby the friction force relatively small, smooth dislocation of each movable member 163A in the longitudinal direction of the solid lubricant 162 is enabled, and consequently it becomes relatively easy to apply an even pressing force to the solid lubricant 162. Further, as compared with the case that the regulation member 164B and the contacting part of each movable member 163A are both spire-shaped, there is the advantage that even if a strong force is instantaneously generated and applied, the arc-shaped contact part of each movable member 163A is hard to be deformed or broken. Consequently, it is easier to realize the even pressing force in a stable manner.

In this embodiment, the description has been made with respect to the case that a lubricant is supplied to the surface of the photoconductor 5. The present invention can be applied to the case in which a lubricant is supplied to the surface of another image bearing member, such as an intermediate transfer belt, etc., or a recording member conveyance member conveying a recording member, such as a transfer sheet, etc.

Furthermore, in this embodiment, the description has been made with respect to the case that a lubricant is supplied to the surface of the photoconductor 5 via the brush roller 161. However, the present invention can be applied to a structure in which a lubricant is supplied to the surface of the photoconductor 5 by causing the solid lubricant 162 to directly contact the surface of the photoconductor 5.

Numerous additional modifications and variations of the present invention are possible in light of the above-teachings. It is therefore to be understood that within the scope of the claims, the present invention can be practiced otherwise than as specifically described herein.

What is claimed is:

1. A lubricant supply device, comprising:

a solid lubricant;

a supply member to contact and rub the solid lubricant and thereby scrape a lubricant off the solid lubricant and supply the lubricant to a lubricant supplying target; and a pressing mechanism to press the solid lubricant against the supply member, the pressing mechanism including one biasing device, and a plurality of pressing members to receive a biasing force of the one biasing device and thereby press places of the solid lubricant at symmetrical positions with respect to a center of a contact part of the solid lubricant contacting the supply member, respectively, wherein the one biasing device generates the biasing force in a direction orthogonal to a direction in which the solid lubricant is pressed and the plurality of pressing members press the places of the solid lubricant at the symmetrical positions by converting the direction of the biasing force to the direction in which the solid lubricant is pressed.

2. The lubricant supply device according to claim 1, wherein the direction in which the solid lubricant is pressed is upward in a vertical direction.

3. The lubricant supply device according to claim 1, further comprising a lubricant holding member to hold the solid lubricant, and wherein the plurality of pressing members press the solid lubricant via the lubricant holding member.

4. The lubricant supply device according to claim 3, wherein the lubricant holding member is attachable and detachable to and from the pressing mechanism.

5. The lubricant supply device according to claim 3, further comprising a dislocation regulation member configured to contact the lubricant holding member at a predetermined regulation position and thereby prevent the lubricant holding member from being dislocated further in the direction in which the solid lubricant is pressed beyond the predetermined regulation position.

6. The lubricant supply device according to claim 5, wherein the predetermined regulation position is set at a position such that the dislocation regulation member contacts the lubricant holding member when the solid lubricant has been used up, or the predetermined regulation position is set at a position shifted in the direction in which the solid lubricant is pressed from the position where the dislocation regulation member contacts the lubricant holding member when the solid lubricant has been used up.

7. The lubricant supply device according to claim 5, wherein the pressing mechanism includes an accommodation case to accommodate at least a part of the lubricant holding member inside thereof, and the accommodation case includes a receiving surface to receive reaction forces applied to the plurality of pressing members in a direction opposite the direction in which the solid lubricant is pressed, and a surface contacting the lubricant holding member and thereby regulating the lubricant holding member from being dislocated in a direction orthogonal to the direction in which the solid lubricant is pressed, at a surface of an internal wall thereof, and an opening part, which the solid lubricant held by the solid lubricant holding member can pass through, at a part opposing the receiving surface, and wherein the dislocation regulation member is provided at an edge part of the opening part of the accommodation case.

8. The lubricant supply device according to claim 7, wherein a part of the lubricant holding member contacting the dislocation regulation member is provided at a position shifted from a surface on the opposite side of a surface of the solid lubricant to be rubbed in the opposite direction of the direction in which the solid lubricant is pressed by a distance equal to or greater than a thickness of the dislocation regulation member provided at the edge part of the opening part of the accommodation case.

9. The lubricant supply device according to claim 1, wherein the pressing mechanism is configured such that each pressing member rotates around a fulcrum and that, as the solid lubricant decreases by being rubbed, an angle formed by a direction connecting a point of action of a contacted part where the pressing member contacts and the fulcrum and the direction in which the solid lubricant is pressed decreases and an angle formed by a direction connecting a point of power of the pressing member where the biasing force of the one biasing device is received and the fulcrum and the direction of the biasing force increases.

10. The lubricant supply device according to claim 1, wherein the pressing mechanism includes guiding surfaces guiding movement of respective pressing members receiving the biasing force of the one biasing device and thereby moving in directions in which the respective pressing members come close to each other or in directions in which the respective pressing members separate from each other, and wherein the guiding surfaces are slanted with respect to the directions in which the respective pressing members come close to each other or the directions in which the respective pressing members separate from each other so that as the respective pressing members move, the respective pressing members are caused to be dislocated in the direction in which the solid lubricant is pressed.

11. The lubricant supply device according to claim 1, further comprising a regulation member to regulate the solid lubricant from being dislocated in a direction of a force which the solid lubricant receives by being rubbed, and wherein a cross section of each of the plurality of pressing members or a contacted part contacting the plurality of pressing members when a contact part of each of the plurality of pressing members and the contacted part has been cut along a virtual plane including the direction of the force which the solid lubricant receives and the direction in which the solid lubricant is pressed is in a spire shape.

12. The lubricant supply device according to claim 11, wherein a regulation groove to regulate a part of the pressing member in a spire shape in the cross section from being dislocated by the force which the solid lubricant receives by being rubbed is provided in a receiving part of the contacted part receiving the part of the pressing member in a spire shape in the cross section or in a receiving part of the pressing member receiving a part of the contacted part in a spire shape in the cross section.

13. The lubricant supply device according to claim 1, further comprising a regulation member to regulate the solid lubricant from being dislocated in a direction of a force which the solid lubricant receives by being rubbed, and wherein a cross section of each of the plurality of pressing members or a contacted part contacting each of the plurality of pressing members when a contact part of each of the plurality of pressing members and the contacted part has been cut along a virtual plane including the direction of the force which the solid lubricant receives and the direction in which the solid lubricant is pressed is in an arc shape.

14. The lubricant supply device according to claim 13, wherein a regulation groove to regulate a part of the pressing member in an arc shape in the cross section from being dislocated by the force which the solid lubricant receives by being rubbed is provided in a receiving part of the contacted part receiving the part of the pressing member in an arc shape in the cross section or in a receiving part of the pressing member receiving a part of the contacted part in an arc shape in the cross section.

* * * * *